(12) United States Patent
Allmendinger et al.

(10) Patent No.: US 8,096,913 B2
(45) Date of Patent: Jan. 17, 2012

(54) LOCKING DIFFERENTIAL ASSEMBLY FOR A MODEL VEHICLE

(75) Inventors: Otto Karl Allmendinger, Rowlett, TX (US); Brent Whitfield Byers, Plano, TX (US); Timothy E. Roberts, Rockwall, TX (US)

(73) Assignee: Traxxas LP, Plano, TX (US)

( * ) Notice: Subject to any disclaimer, the term of this patent is extended or adjusted under 35 U.S.C. 154(b) by 475 days.

(21) Appl. No.: 12/250,499

(22) Filed: Oct. 13, 2008

(65) Prior Publication Data

US 2010/0093482 A1 Apr. 15, 2010

(51) Int. Cl.
*F16H 48/20* (2006.01)

(52) U.S. Cl. ......................................................... 475/231
(58) Field of Classification Search .................. 475/231, 475/234, 237, 249, 250
See application file for complete search history.

(56) References Cited

U.S. PATENT DOCUMENTS

| | | | | |
|---|---|---|---|---|
| 1,032,261 A * | 7/1912 | Wright et al. | ................ | 475/237 |
| 1,723,901 A * | 8/1929 | Todd | ............... | 475/237 |
| 4,570,509 A * | 2/1986 | Nighswonger | ................ | 475/86 |
| 4,751,856 A * | 6/1988 | Nakamura et al. | .............. | 477/35 |
| 6,174,255 B1 * | 1/2001 | Porter et al. | ................... | 475/84 |
| 6,976,553 B1 * | 12/2005 | Dahl et al. | ....................... | 180/247 |
| 7,101,312 B2 * | 9/2006 | Bauerle et al. | ................ | 477/111 |
| 7,220,209 B1 * | 5/2007 | Dahl et al. | ..................... | 475/237 |
| 7,600,599 B1 * | 10/2009 | Dahl et al. | ..................... | 180/249 |
| 7,837,585 B2 * | 11/2010 | Pinkos et al. | .................. | 475/150 |
| 2004/0248692 A1 * | 12/2004 | Bryson et al. | ................. | 475/231 |

OTHER PUBLICATIONS

OX Offroad Products Lockers, www.ox-usa.com.
EATON Automotive, Eaton ELockerTM Differential Operating & Installation Instructions.

* cited by examiner

*Primary Examiner* — David D Le
*Assistant Examiner* — Michael Gonzalez
(74) *Attorney, Agent, or Firm* — Carr LLP

(57) ABSTRACT

A locking differential assembly for use in a toy model vehicle. This is accomplished by mounting a locking clutch assembly on an output shaft of a differential gear carrier having an external face. The locking clutch assembly includes a slider member that may be configured to move along the output shaft to engage the external face to disable a differential action of the differential gear carrier.

23 Claims, 23 Drawing Sheets

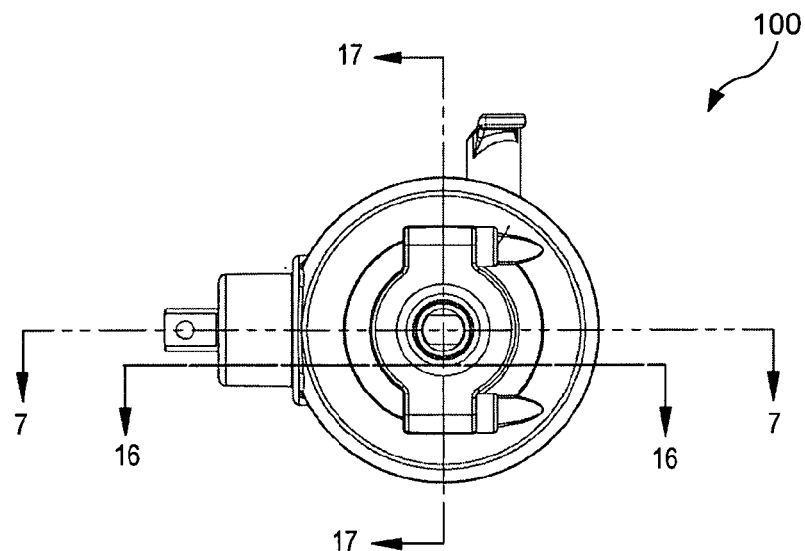
FIG. 2D
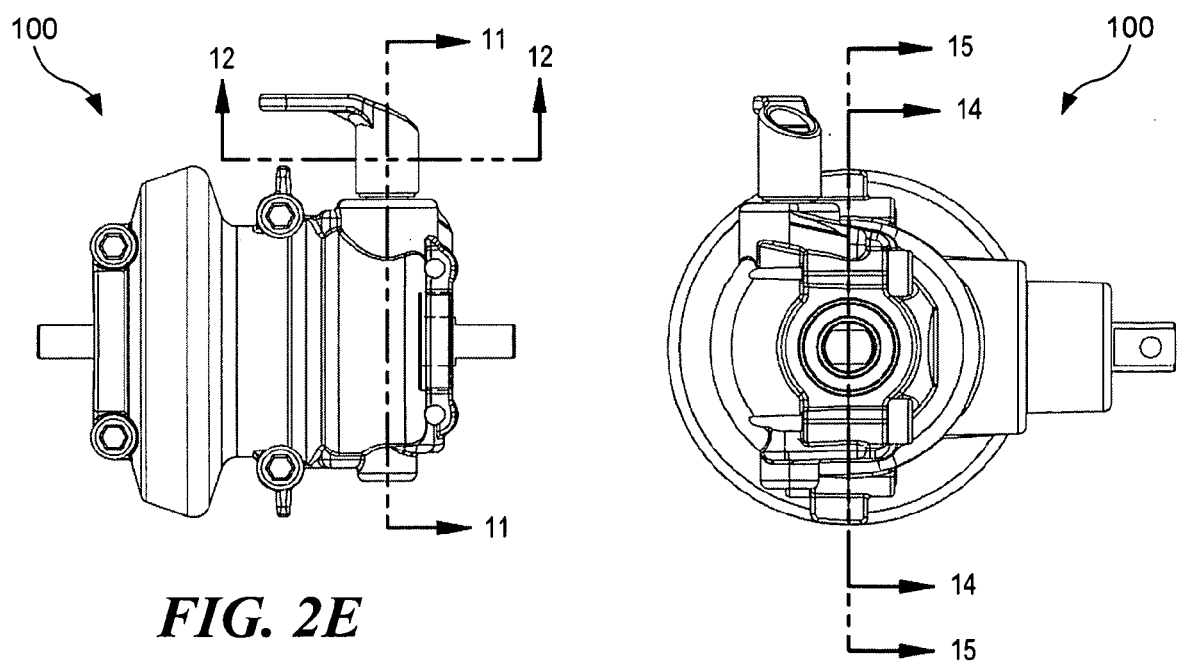
FIG. 2E  FIG. 2F

LOCKING DIFFERENTIAL ASSEMBLY FOR A MODEL VEHICLE

FIELD OF THE INVENTION

The present invention relates to vehicle design and, more particularly, to remote control and model vehicles.

BACKGROUND

Vehicles, in particular remotely controlled toy model vehicles, such as models and other reduced-sized vehicles, are driven in a variety of conditions, sometimes requiring different power train operation. Such conditions might include maneuvering around obstacles, often requiring tight turns. Off-road conditions, as another example, may cause a wheel to lose traction, such as when crossing a wet or sandy patch, or to lose its purchase on uneven terrain.

To enhance maneuvering, an "open differential" may be incorporated into such vehicles to assist in equalizing the torque of a pair of driven wheels. A typical open differential has a gear box which allows the driven wheels of a pair to rotate at different relative rates. Allowing rotation of the wheels at different relative rates compensates for different travel distances of inner and outer wheels during a turn. The outer wheel can rotate more quickly than the inner wheel, thereby preventing or reducing sluggish handling, tire damage, and undue strain on the drive train.

To enhance all-terrain operation, a "locked differential" may be incorporated to offer prevent or reduce the effects of traction differences at each driven wheel of a pair. This is typically accomplished, by disabling or reducing the ability of the wheels to spin at different rates. When the differential is fully locked, the pair of driven wheel each turns at the same rate, without regard to differences between traction on the underlying terrain or between the loads on each wheel.

A "locking differential" has also been used to address the needs of maneuvering and operation on variable terrain. A locking differential may be switched between "open" and "locked" (fully or partially) modes of operation, as desired. However, previously available locking differentials have been complex, difficult to assemble and relatively expensive.

SUMMARY OF THE INVENTION

A model vehicle locking differential is provided, comprising a differential gear carrier having an output shaft. A locking device coupled to the output shaft is configured to engage with and disengage from the gear carrier. Actuation of the locking device between engaged and disengaged positions disables and enables, respectively, the differential action of the differential gear carrier.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2D-F are a front view of a locking differential assembly, showing reference sectional lines 7-7, 16-16, and 17-17, a first side view of the locking differential assembly showing reference sectional lines 12-12 and 11-11, and a rear view of the locking differential assembly showing reference lines 15-15 and 14-14;

DETAILED DESCRIPTION

Figure 1:
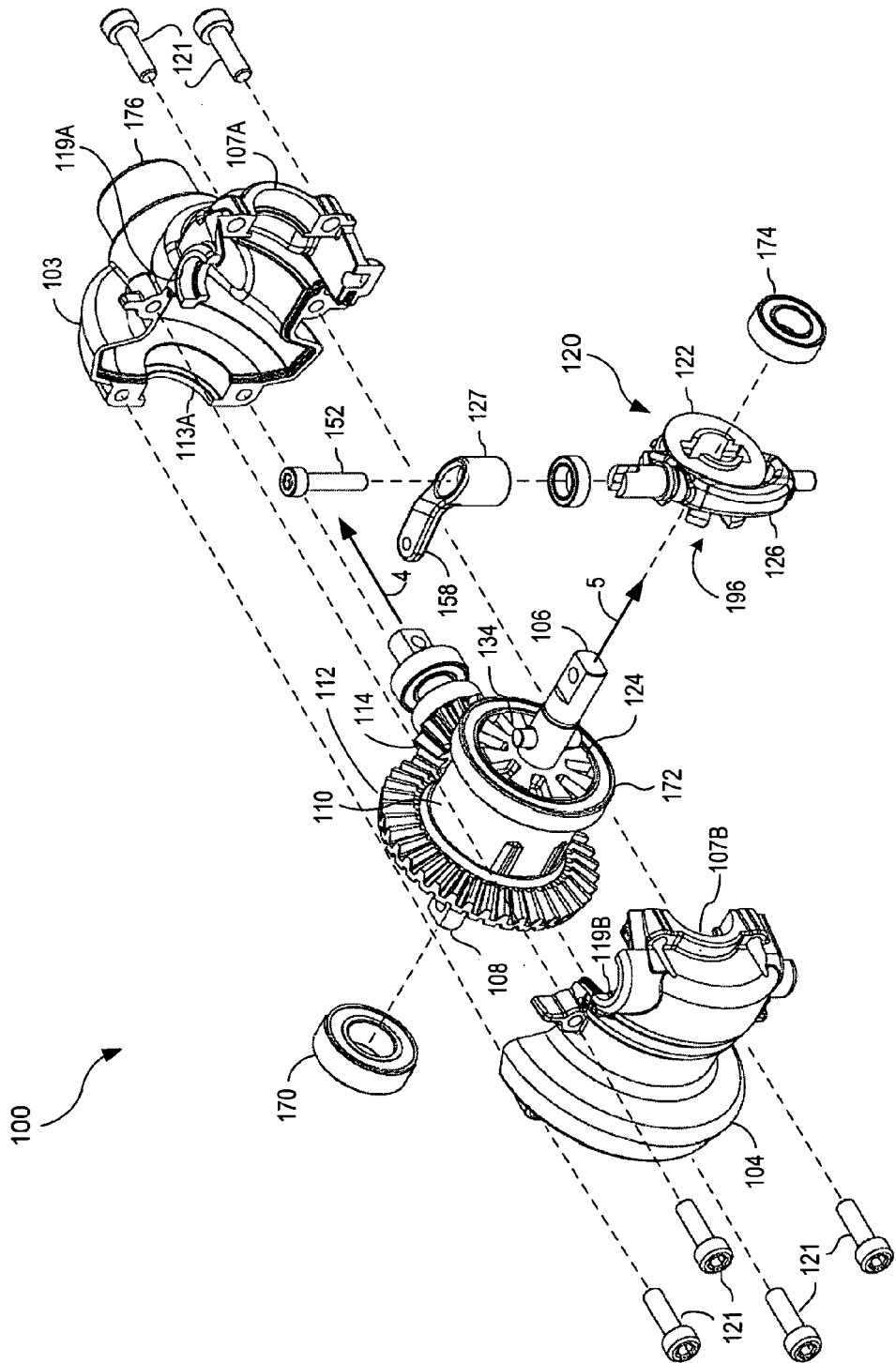
FIG. 1 is a perspective view with some components exploded in at least one embodiment of a locking differential assembly.

FIG. 1 shows a perspective view, in at least one embodiment, with some components exploded of a locking differential assembly 100. The locking differential assembly 100 may comprise an outer housing 102, shown exploded and separated into a first part 103 and a second part 104. The outer housing 102 may provide a generally hollow shell creating an inner cavity for protecting and mounting inner components of the locking differential assembly 100. The outer housing 102 may be shaped to generally follow the contours of the inner components in order to conserve volume.

The locking differential assembly 100 may further comprise a differential gear carrier 110, which may be mounted within the outer housing 102. The differential gear carrier 110 may comprise a ring gear 112 configured to receive a rotating force from a drive pinion 114, which may be mounted on a drive axis 4. The ring gear 112 may be rotationally mated to a cluster of gears (not shown) within the differential gear carrier 110 such that a driving torque transmitted from the ring gear 112 to the differential gear carrier 110 results in a first output torque to a first output shaft 106 and a second output torque to a second output shaft 108. The first output shaft 106 and the second output shaft 108 may be mounted along the same output axis, such as axis 5.

Referring further to FIG. 1, the locking differential assembly 100 may further comprise a locking clutch assembly 120 for alternating the locking differential assembly 100 between a locked position and an unlocked position. The locking clutch assembly 120 may be positioned along the first output shaft 106 apart from the differential gear carrier 110. In some embodiments, positioning the locking clutch assembly 120 outside the differential gear carrier 110 may eliminate the need for a linkage that can actuate a locking clutch if the locking clutch were positioned within the differential gear carrier.

In some embodiments, at least a portion of the locking clutch assembly 120 may translate along the axis 5 to engage the differential gear carrier 110. In the unlocked or open position, the differential gear carrier 110 may provide a differential action to the first output shaft 106 and the second output shaft 108. The locking clutch assembly 120 may not be engaged with the differential gear carrier 110. In the locked position, the locking clutch assembly 120 may engage the differential gear carrier 110 to disable the differential action.

The locking clutch assembly 120 may include a moving member, such as slider 122, configured to engage an external face 124 of the differential gear carrier 110. The slider 122 may be slideably mounted to the first output shaft 106. The slider 122 is shown in FIG. 1 as exploded from the differential gear carrier 110 for illustrative purposes. An actuator 126 may engage the slider 122 to move the slider 122 into and out of the locked position and open position.

A lever member 127 may be coupled to the actuator 126 by a first bolt 152 to rotate the actuator 126. The lever member 127 may comprise generally a cylindrical body or stem having a lever arm member 158 that extends from the body portion of the lever member 127. The rotational movement of the actuator 126 may be converted to translational movement of the slider 122 when the rotating actuator 126 pushes the slider 122 along the first output shaft 106.

Figure 2A:
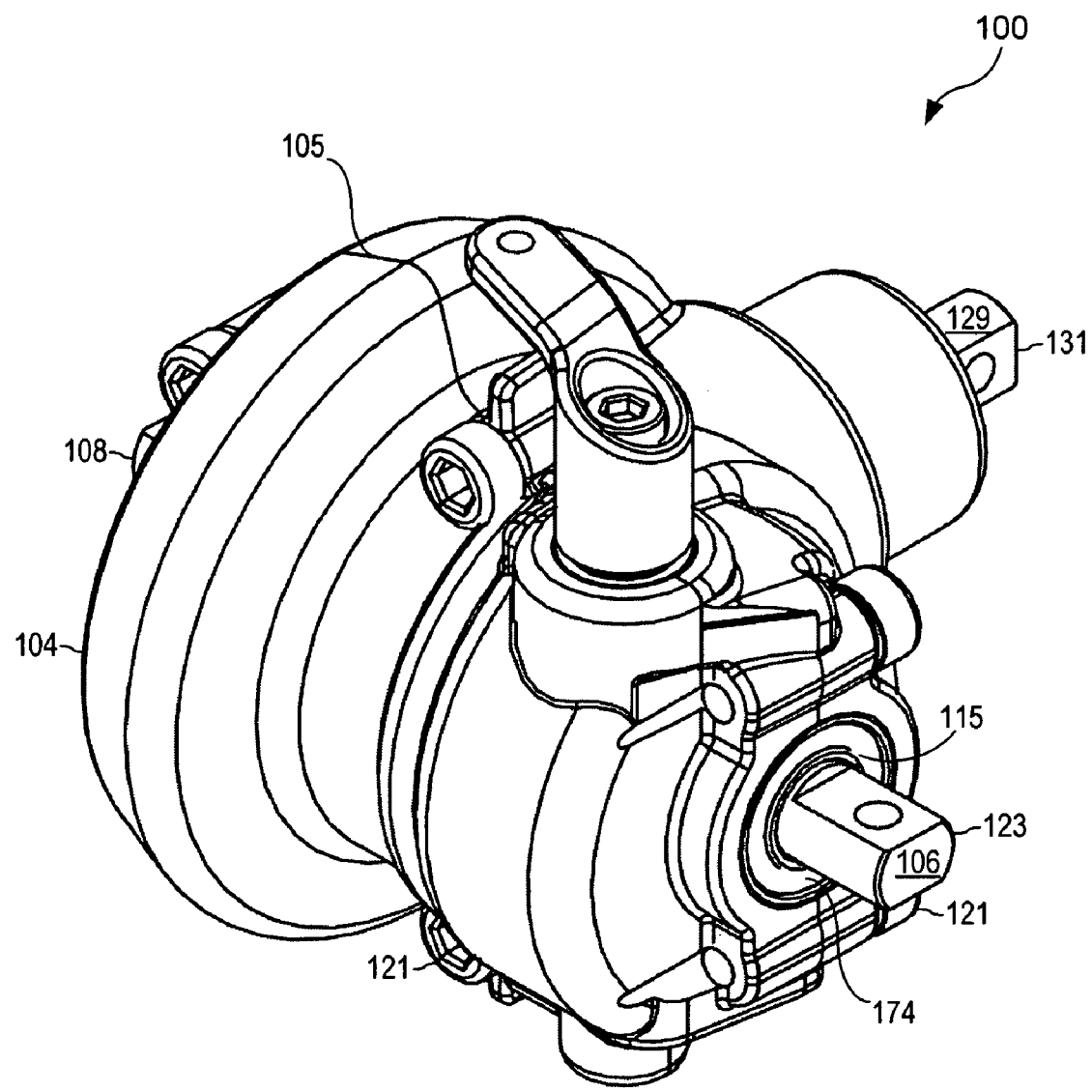
FIGS. 2A through 2C are a perspective view of a locking differential assembly in an assembled configuration, a top view of a locking differential assembly, and a side view of a locking differential assembly, respectively.
Figure 2B:
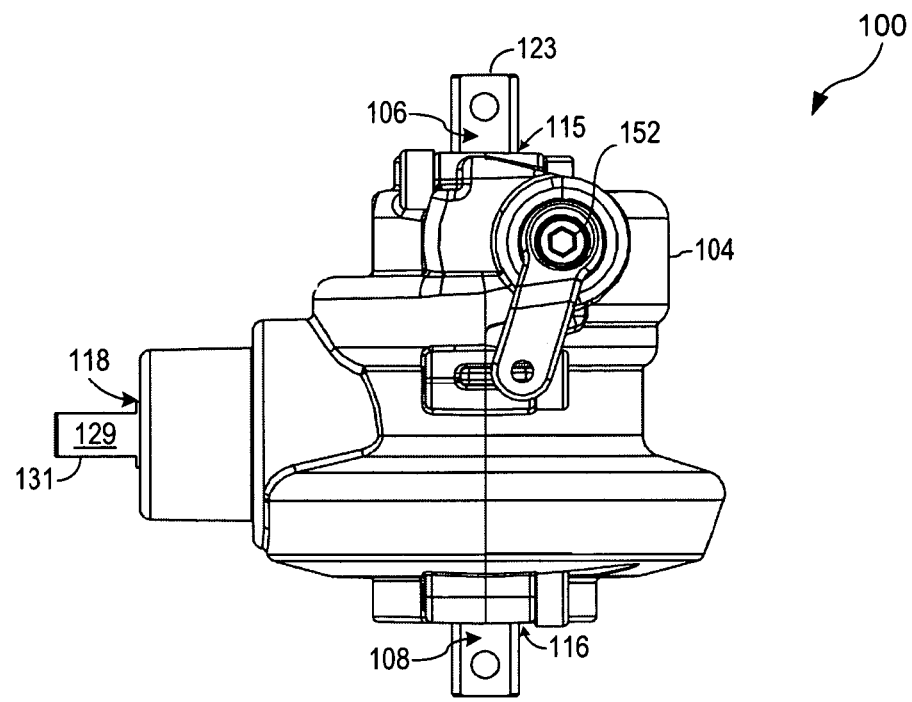
Figure 2C:
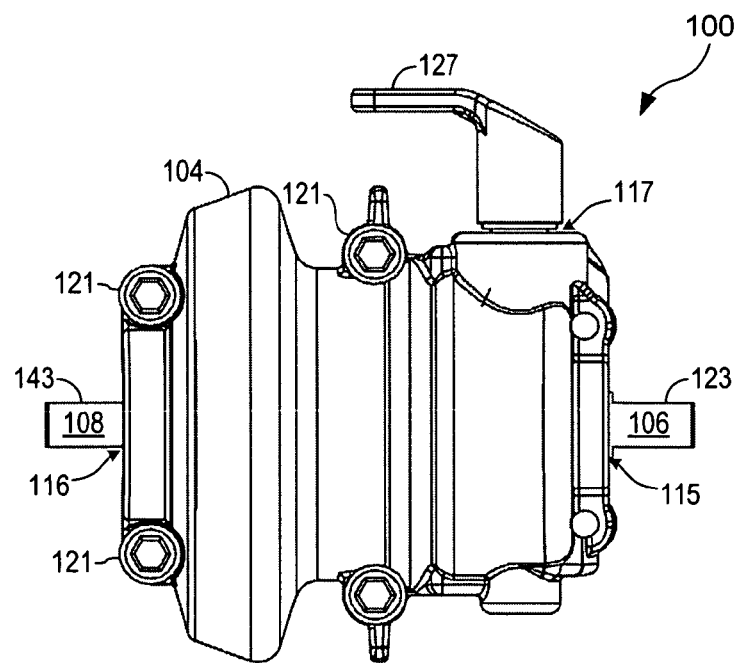

In some embodiments, the first part 103 and the second part 104 of the outer housing 102 may form a shell having a first aperture 115, a second aperture 116, and a third aperture 117 (as shown in FIG. 2A-2C). The first aperture 115 may be formed from first edge surfaces 107a and 107b of the first part 103 and the second part 104, respectively. The second aperture 116 may be formed from second edge surfaces 113a and 113b (shown in FIG. 9B) of the first part 103 and the second part 104, respectively. The third aperture 117 may be formed from third edge surfaces 119a and 119b of the first part 103 and the second part 104, respectively. Each of the first aperture 115, the second aperture 116, and the third aperture 117 may have a generally circular shape and configured to receive the first output shaft 106, the second output shaft 108, and a portion of the actuator 126 (as described in more detail in FIG. 11), respectively.

Referring now to FIGS. 2A, 2B, and 2C, there are shown a perspective view of the locking differential assembly 100 in an assembled configuration, a top view of the locking differential assembly 100, and a first side view of the locking differential assembly 100, respectively. The first part 103 and the second part 104 may be configured to mate together to form seam 105 as the boundary between the two parts 103 and 104. The mating of the first part 103 and the second part 104 may form the first aperture 115, the second aperture 116, and the third aperture 117, as shown in FIGS. 2B and 2C.

A portion of the first output shaft 106 may extend from the first aperture 115 so that the first output shaft 106 may be coupled to an axle of a vehicle wheel (not shown). The portion of the first output shaft 106 that extends from the first aperture 115 may comprise a first coupling feature 123. In some embodiments, the first coupling feature 123 may comprise a set of flattened surfaces and a bore for mating with a linkage to the axle. It will be understood by a person of ordinary skill in the art that other methods and components for coupling a shaft to a vehicle wheel axle may be utilized.

A portion of the second output shaft 108 may extend from the second aperture 116 so that the second output shaft 108 may be coupled coaxially to the same axle of a vehicle wheel as the first output shaft 106. The portion of the second output shaft 108 that extends from the second aperture 116 may comprise a second coupling feature 143. In some embodiments, the second coupling feature 143 may comprise a set of flattened surfaces and a bore for mating with a linkage to the axle. It will be understood by a person of ordinary skill in the art that other methods and components for coupling a shaft to a vehicle wheel axle may be utilized.

A portion of the actuator 126 (not shown) may extend from the third aperture 117 to couple with the lever member 127. The coupling between the actuator 126 and the lever member 127 will be described in greater detail in reference to FIGS. 11 and 12.

In some embodiments, the first part 103 and the second part 104 may be coupled by a plurality of bolts 121 received within threaded bores in the first part 103 and the second part 104 which match up when the two parts 103 and 104 are mated so that when a bolt of the plurality of bolts 121 (also shown in FIG. 1) is threaded it threadably engages a bore in the first part 103 and a bore in the second part 104. In the embodiments shown, four bolts 121 may be inserted into bores in the second part 104 to engage bores in the first part 113 and two bolts 121 may be inserted into bores in the first part 103 to engage bores in the second part 104.

Referring to FIG. 2B, the first part 103 may comprise a fourth aperture 118 for receiving a shaft portion 129 of the drive pinion 114 (not shown except for shaft portion 129). The shaft portion 129 may extend from the fourth aperture 118. The shaft portion 129 may comprise a third coupling feature 131 for coupling the drive pinion 114 to a drive shaft of a toy model vehicle (not shown). The third coupling feature 131 may comprise a bore and a set of flattened surfaces suitable for coupling to a mechanical linkage (not shown). It should be recognized by a person of ordinary skill that the connection feature may comprise other types of coupling devices intended for transferring torque.

Referring now to FIGS. 2D, 2E, and 2F there are shown a front view of the locking differential assembly 100, showing reference sectional lines 7-7, 16-16, and 17-17, a first side view of the locking differential assembly 100 showing reference sectional lines 12-12 and 11-11, and a rear view of the locking differential assembly 100 showing reference lines 15-15 and 14-14. The numbering on the sectional lines corresponds to the figure number that displays each sectional view.

Figure 3:
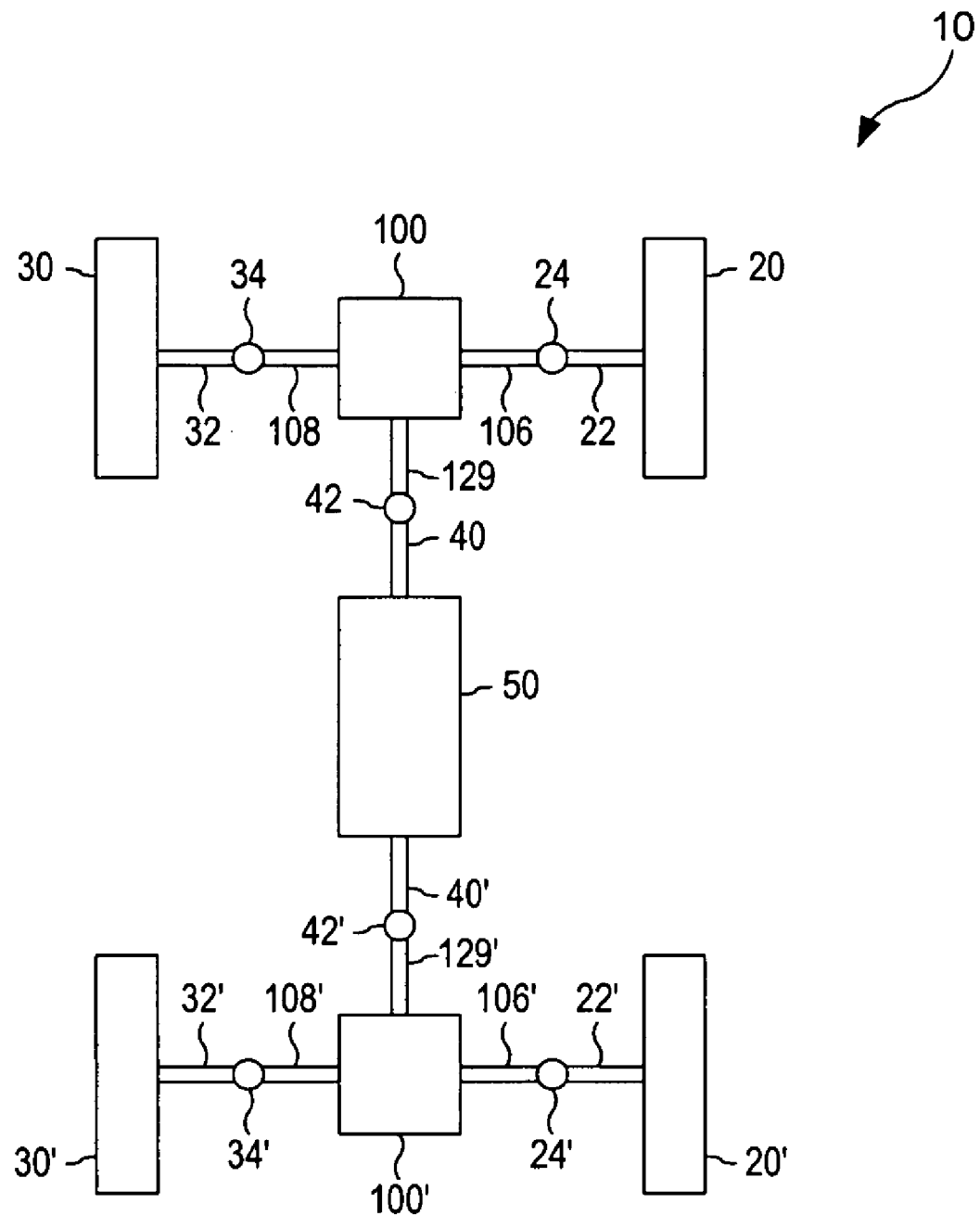
FIG. 3 shows a schematic drawing of components of a system 200 for disabling the differential action between one or more pairs of driven wheels of a toy model vehicle 10.

Referring now to FIG. 3, there is shown a schematic drawing of components of a system for disabling the differential action between one or more pairs of driven wheels of the toy model vehicle, such as that shown for toy model vehicle 10. In some embodiments, the first output shaft 106 of the locking differential assembly 100 may be rotationally coupled by a first linkage 24 to an axle portion 22 of a first toy model vehicle wheel 20, and the second output shaft 108 may be rotationally coupled by a second linkage 34 to an axle portion 32 of a second toy model vehicle wheel 30. The shaft portion 129 of the drive pinion 114 (also shown in FIG. 2A) may be rotationally coupled by a third linkage 42 to a drive shaft 40 which may receive a driving torque from a transmission 50 of the toy model vehicle 10. It will be understood by a person of ordinary skill in the art that the power source that provides the driving torque may comprise other mechanical means for generating torque, such as electric motors and internal combustion engines.

In some embodiments, the locking differential assembly 100 herein described may be incorporated for use within one or more commercially available toy model vehicles. For example, the locking differential assembly 100 may be incorporated for use in the E-MAXX™ and REVO® model vehicles available from Traxxas, L.P., 1100 Klein Rd., Plano, Tex. 75074. Also, the locking differential assembly 100 may be incorporated for use within and conjunction with the inventions described in the U.S. Application Publication No. US 2006/0260860 A1 and U.S. Provisional Patent Application Ser. No. 60/669,664 entitled "MOTOR OPERATED VEHICLE," filed on Apr. 7, 2005. Co-pending U.S. patent application Ser. No. 11/348,998 of Byers et al. "PIVOTING ENGINE MOUNT FOR A MODEL VEHICLE" and U.S. Provisional Patent Application Ser. No. 60/669,664 are hereby incorporated by reference for all purposes. These examples are not intended to limit the use of the locking differential assembly 100 to a certain model or configuration of model vehicle, and these examples are intended as illustrative.

Referring now to FIGS. 4, 5, 6 and 7, there is shown an exploded view of the differential gear carrier 110, a perspective view of the cluster assembly 160 comprising gears configured for operation as a differential gear box, such as in differential gear carrier 110, a rear view of the carrier housing 111 of the differential gear carrier 110 and a cross-sectional view of the differential gear carrier 100, respectively.

The differential gear carrier 110 may comprise a carrier housing 111, which may support the ring gear 112. The carrier housing 111 may comprise generally a hollow cylindrical member having a closed cylindrical side and an open side. The open side may be configured to receive the cluster assembly 160.

Figure 17:
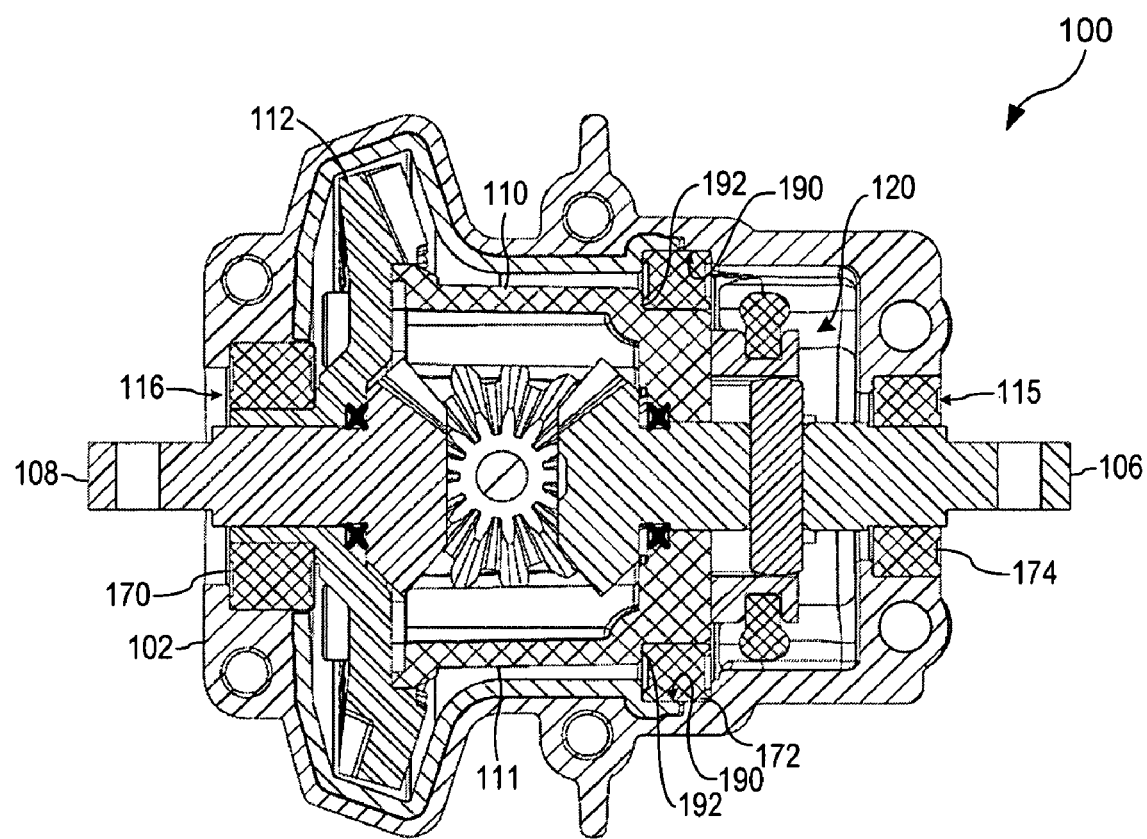
FIG. 17 is a sectional view of a locking differential assembly taken along line 17-17 as referenced in FIG. 2D.

The carrier housing 111 may be supported by ball bearings in the inner cavity of the outer housing 102, as described in FIG. 17. The external face 124 having the at least one groove 128 may comprise a clutch plate of the differential gear carrier and be positioned at the outer surface of the carrier housing 111. An inner surface of the carrier housing 111 may further comprise an output shaft aperture 181 for receiving the first output shaft 106.

Figure 4:
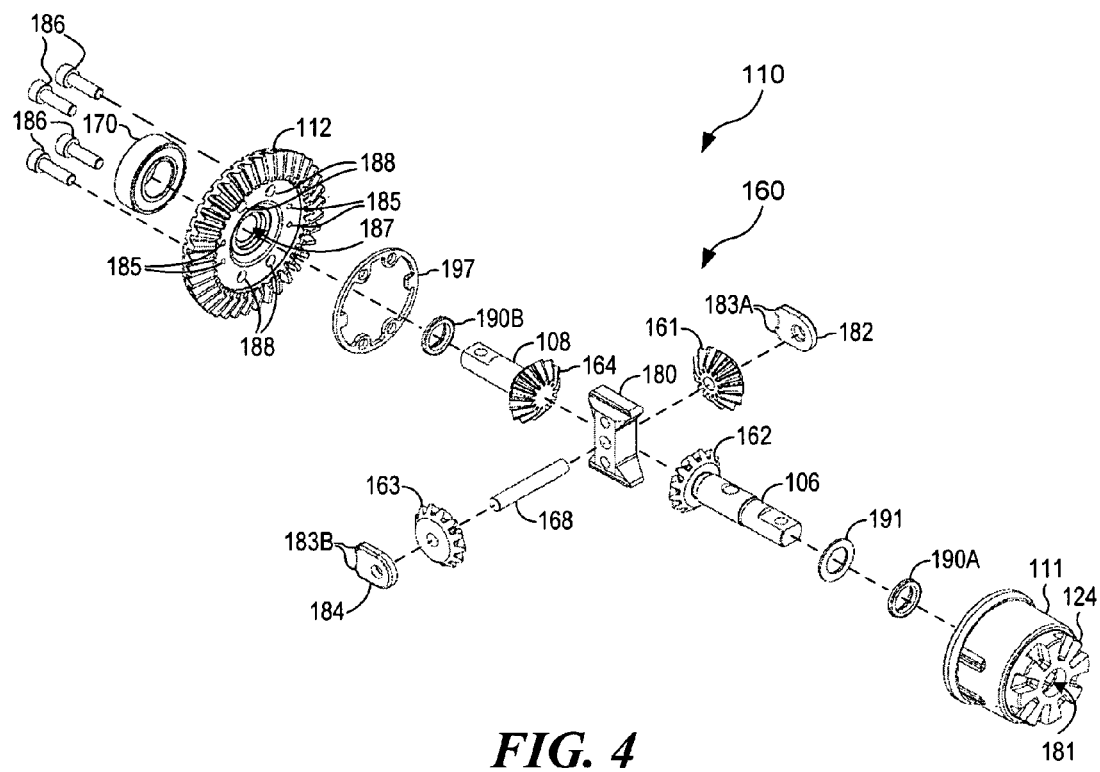
FIG. 4 is an exploded perspective view of a differential gear carrier.

As shown in FIG. 4, the cluster assembly 160 may comprise a first side gear 162 and a second side gear 164, which may each comprise a gear portion configured to mesh with neighboring gears. In some embodiments, the first output shaft 106 may comprise a shaft portion of the first side gear 162. The first side gear 162 may drive the first output shaft 106. The second output shaft 108 may comprise a shaft portion of the second side gear 164. The second side gear 164 may drive the second output shaft 108.

The cluster assembly 160 may further comprise a first idler gear 161 and a second idler gear 163, which may each comprise a spider gear, and both may function as idlers in the cluster assembly 160. The first idler gear 161 may have a bore configured to receive an idler post 168. The second idler gear 163 may have a bore configured to receive the idler post 168. The idler post 168 may serve as an axle for the first idler gear 161 and second idler gear 163, so that each may independently rotate about the idler post 168. The first idler gear 161 and the second idler gear 163 may be further configured to mesh with neighboring gears.

The cluster assembly 160 may further comprise an idler post support 180, which may be set between the first idler gear 161 and the second idler gear 163. The idler post support may improve strength and stiffness by connecting the center portion of the idler post 168 to the carrier housing 111.

The cluster assembly 160 may further comprise a first idler post bushing 182 and a second idler post bushing 184. The first idler post bushing 182 and the second idler post bushing 184 may each comprise a generally flat member having a central bore for receiving an end portion of the idler post 168 and extensions 183a and 183b, respectively. In some embodiments, the first idler post bushing 182 and the second idler post bushing 184 may rest against the ring gear 112. The first idler post bushing 182 and the second idler post bushing 184 may couple to the idler post 168 and be configured to bracket and support the first idler gear 161 and the second idler gear 163. The first idler post bushing 182 and the second idler post bushing 184 may provide improved load distribution to the carrier housing 111 in supporting the idler post 168 and may assist in transferring the rotational force of the carrier housing to the idler post 168.

Figure 5:
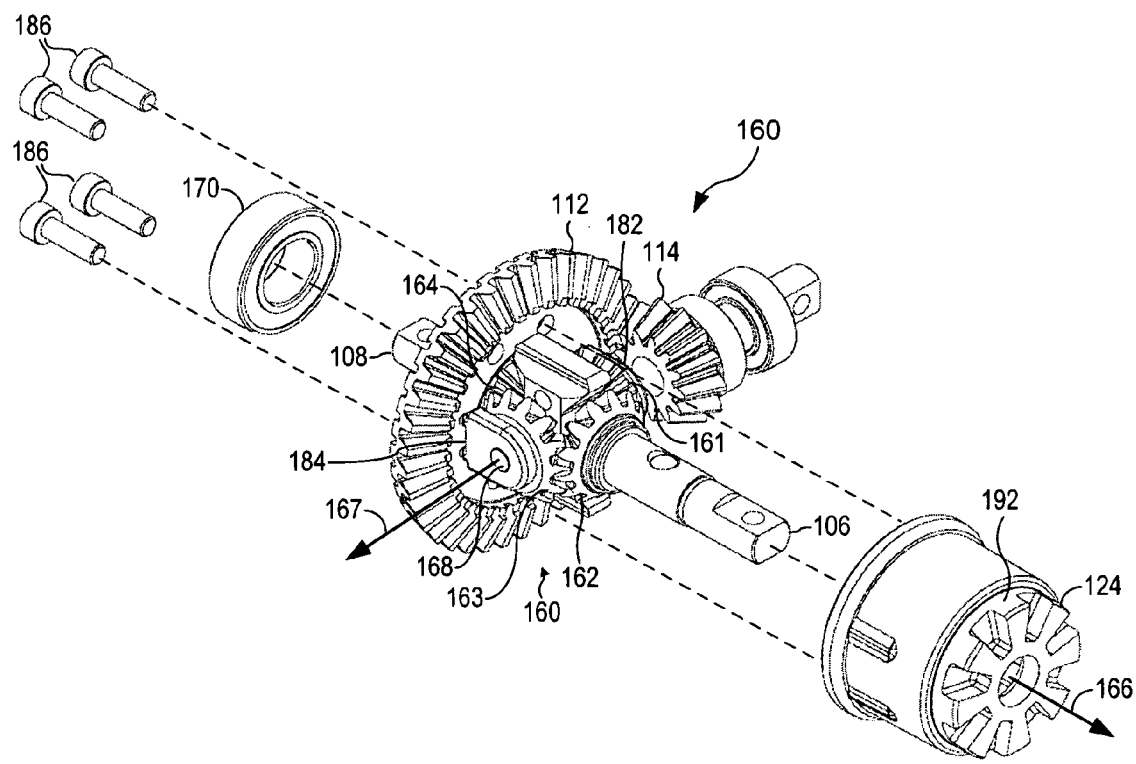
FIG. 5 is an exploded perspective view of a cluster assembly comprising gears configured for operation as a differential gear box.

Referring now to FIGS. 4 and 5, the ring gear 112 may comprise a circular and generally flat member having gear teeth about its outer circumference on at least one side surface. The gear teeth of the ring gear 112 may be configured to mesh with gear teeth of the drive pinion 114. The ring gear 112 may further comprise a plurality of support apertures 185, which in some embodiments may be configured to receive pin members (not shown) to assist in coupling the cluster assembly 160 to the ring gear 112. The ring gear 112 may further comprise a plurality of fastener apertures 188 configured to receive a fastener, such as a bolt from a plurality of bolts 186.

The ring gear 112 may be further configured with an output post aperture 187, having a general circular shape, to mount on the second output shaft 108 for independent rotation. The output post aperture 187 may have indentations or grooves for receiving seals or washers for mounting the ring gear 112 to the second output post 108.

Figure 6:
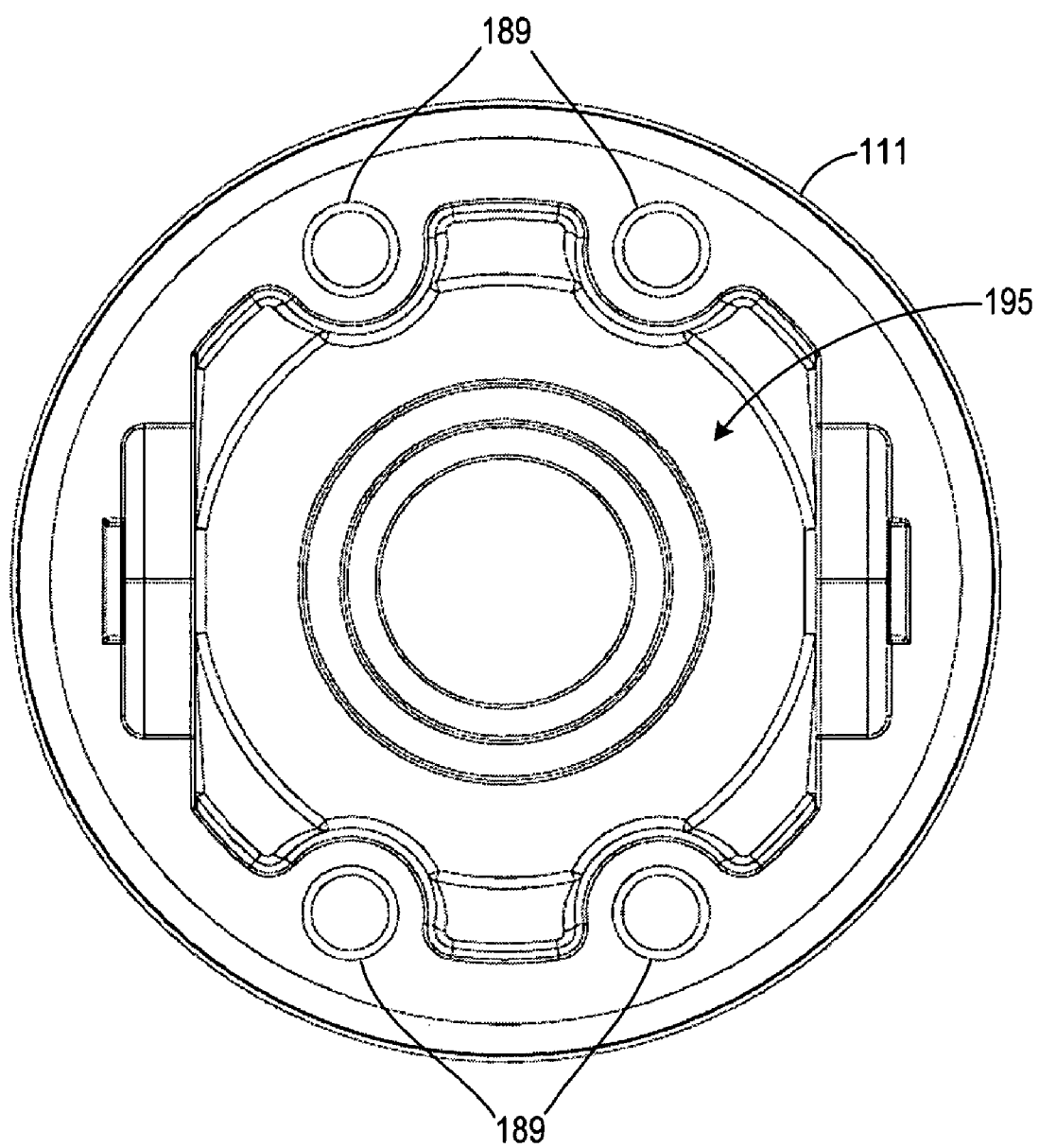
FIG. 6 is a rear view of a carrier housing of a differential gear carrier.

Referring now to FIG. 6, there is shown a view of the carrier housing 111, including a view of a carrier cavity 195 formed by an inner surface of the carrier housing 111. The carrier housing 111 may comprise a plurality of threaded bores 189 for receiving a plurality of threaded fasteners, such as bolts 186, as shown in FIGS. 4 and 5.

Referring to FIG. 5, the carrier housing 111 may rigidly mount to the ring gear 112 to support the cluster assembly 160. The bolts 186 may fasten the ring gear 112 to the carrier housing 111 to enclose the cluster assembly 160. The bolts 186 may each pass through one of the plurality of fastener apertures 188 in the ring gear 112 and threadably engage one of a plurality of threaded bores 189 (as shown in FIG. 6) in the carrier housing 111.

The ring gear 112 may mesh with the drive pinion 114 to receive a driving torque, supplied, by a motor or an engine (not shown). The coupling of the ring gear 112 to the carrier housing 111 of the differential gear carrier 110 may not allow relative motion or rotation between the ring gear 112 and the differential gear carrier 110. The ring gear 112 and carrier housing 111 (shown exploded from the ring gear 112) may be coaxially mounted for rotation together about a first axis 166.

The cluster assembly 160 may be mounted within the carrier housing 111, shown exploded in FIG. 5. The first side gear 162 and the second side gear 164 may be coaxially aligned on the first axis 166.

The first idler gear 161 and the second idler gear 163 may be aligned on a second axis 167 which may be perpendicular to the first axis 166. The second axis 167 is fixed along the idler post 168 and may rotate with the differential gear carrier 110.

Figure 7:
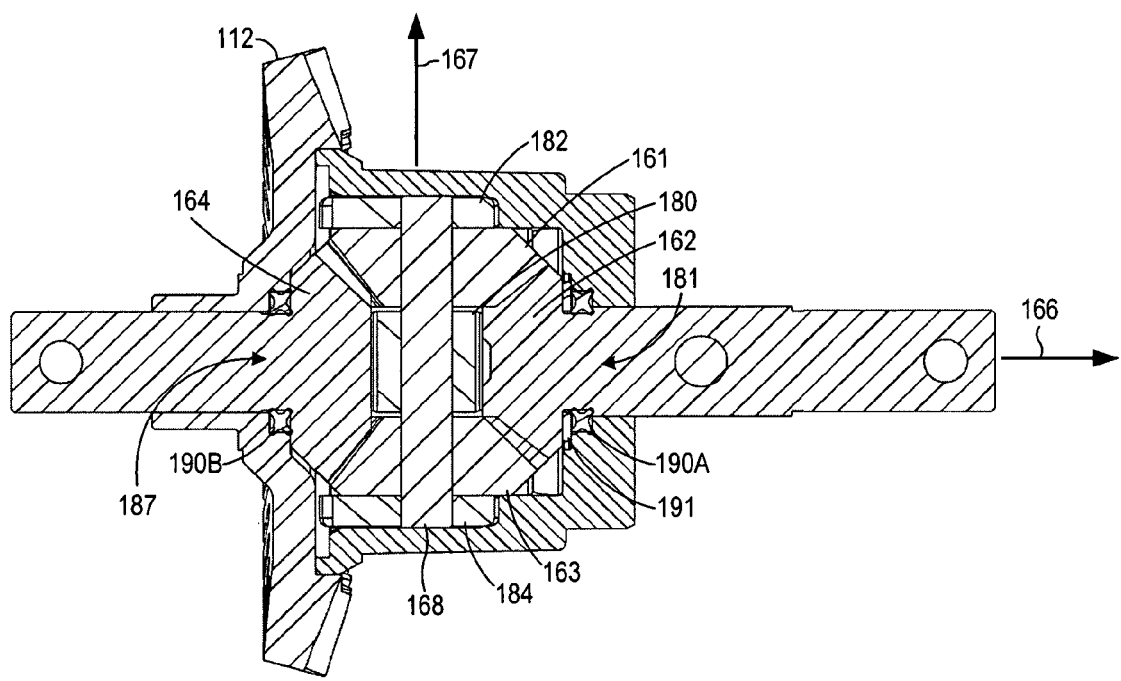
FIG. 7 is a cross-sectional view of a differential gear carrier taken along line 7-7 as referenced in FIG. 2D.

As shown in FIG. 7, the gears of cluster assembly 160 may be arranged in generally a rectangular formation so that each gear meshes with two neighboring gears. The first side gear 162 may mesh with the first idler gear 161 and the second idler gear 163. The second side gear 164 may mesh with the first idler gear 161 and the second idler gear 163.

As shown in FIGS. 5 and 7, the cluster assembly 160 may be assembled by configuring the idler post 168 to pass through the bore of the second idler post bushing 184, the bore of the second idler gear 163, the bore of the idler post support 180, the bore of the first idler gear 161, and the bore of the first idler post bushing 182, which may be held in position by the carrier cavity 195 of the carrier housing 111. In some embodiments, the idler post 168 may slide into the first idler post bushing 182 and the second idler post bushing 184 without fastening the idler post 168 to the first idler post bushing 182 and the second idler post bushing 184. The first idler gear 161 and second idler gear 163 may remain free to independently rotate about the idler post 168, but may be constrained from translating along the idler post 168 by the idler post support 180.

Referring now to FIGS. 4 and 7, the gears of the cluster assembly 160 may be lubricated to decrease loss of torque between the gears due to friction. In some embodiments, lubricant, such as silicon oil or other suitable lubricants, may be injected into the carrier housing 111. Heavy oils or grease may be used to create high viscous friction to aid the differential in transmitting torque equally to the wheels when it is the open or unlocked configuration. The carrier housing may be sealed to help retain the lubricant by a first x-ring seal 190a, which may be positioned around the first output shaft 106 between a groove in the first output shaft 106 near the first side gear 162 and an inner corner surface located near the output shaft aperture 181 of the carrier housing 111. A second x-ring seal 190b may be positioned around the second output shaft 108 between an inner corner surface located near in the output post aperture 187 and a groove in the second output shaft 108 near the second side gear 164.

Further sealant or a gasket may be fixed to the seams formed where the carrier housing 111 and the ring gear 112 meet. As shown in FIG. 4, a gasket 197 may be mounted between the ring gear 112 and the carrier housing 111 to form a seal to prevent leakage of lubricant and the entrance of contaminants into the carrier housing 111.

Washers may be place along the first output shaft 106 and along the second output shaft 108 to provide wear surfaces between rotating components. In the embodiment shown in FIGS. 4 and 7, a washer 191 may be positioned around the first output shaft 106 between an inner portion of the carrier housing 111 and a radially extended portion of the first side gear 162. The washer 191 may provide a buffer surface that may prevent wear during the relative rotation between the carrier housing 111 and the first side gear 162.

Referring now to FIGS. 5 and 7, the cluster assembly 160 may be further configured so that an input drive torque applied to the ring gear 112 may rotate the differential gear carrier 110, and output the first drive torque to the first output shaft 106 and the second drive torque to the second output shaft 108. This rotation may cause the second axis 167, where the first idler gear 161 and the second idler gear 163 are aligned, to rotate, which may impart the motion of the ring gear 112 to the first side gear 162 and the second side gear 164 by a pushing of the first idler gear 161 and the second idler gear 163 against the first side gear 162 and the second side gear 164, respectively. When the toy model vehicle 10 (shown in FIG. 3) is traveling in a straight line with no tractional differences between the two driven wheels 20 and 30 (shown in FIG. 3), the same teeth of the first side gear 162 and the second side gear 164 stay in contact with the same teeth of the first idler gear 161 and the second pinion gear 163. In this traveling straight configuration, the first idler gear 161 and the second idler gear 163 do not rotate about the idler post 168, but do rotate in unison around the first axis 166.

When the toy model vehicle 10 (as shown in FIG. 3) experiences varying traction at each driven wheel 20 and 30, the first idler gear 161 and the second idler gear 163 continue to rotate in unison around the first axis 166, but now may rotate about the idler post 168 which lies along the second axis 167. This rotation of the first idler gear 161 and the second idler gear 163 compensates for the tractional differences experienced by each driven wheel 20 and 30 (shown in FIG. 3) so that the first idler gear 161 and the second idler gear 163 rotate at different rates.

In the unlocked position, the differential gear carrier 110 may transfer the driving torque from an input torque of the drive pinion 114 and transfer the torque evenly between the first output shaft 106 and the second output shaft 108. The rotation rate of the first output shaft 106 may be different from the rotation rate of the second output shaft 108.

In the locked position, the first output shaft 106 and the second output shaft 108 may be locked to each other causing the first output shaft 106 and the second output shaft 108 to turn in unison at the same rotational rate. The differential gear carrier 110 may transfer the driving torque from an input torque of the drive pinion 114 and transfer the driving torque unevenly to each wheel depending on the tractional differences that each wheel experiences. Thus, in a locked position, the rotational rate between each drive wheel remains constant while the torque applied between each wheel varies.

Figure 8:
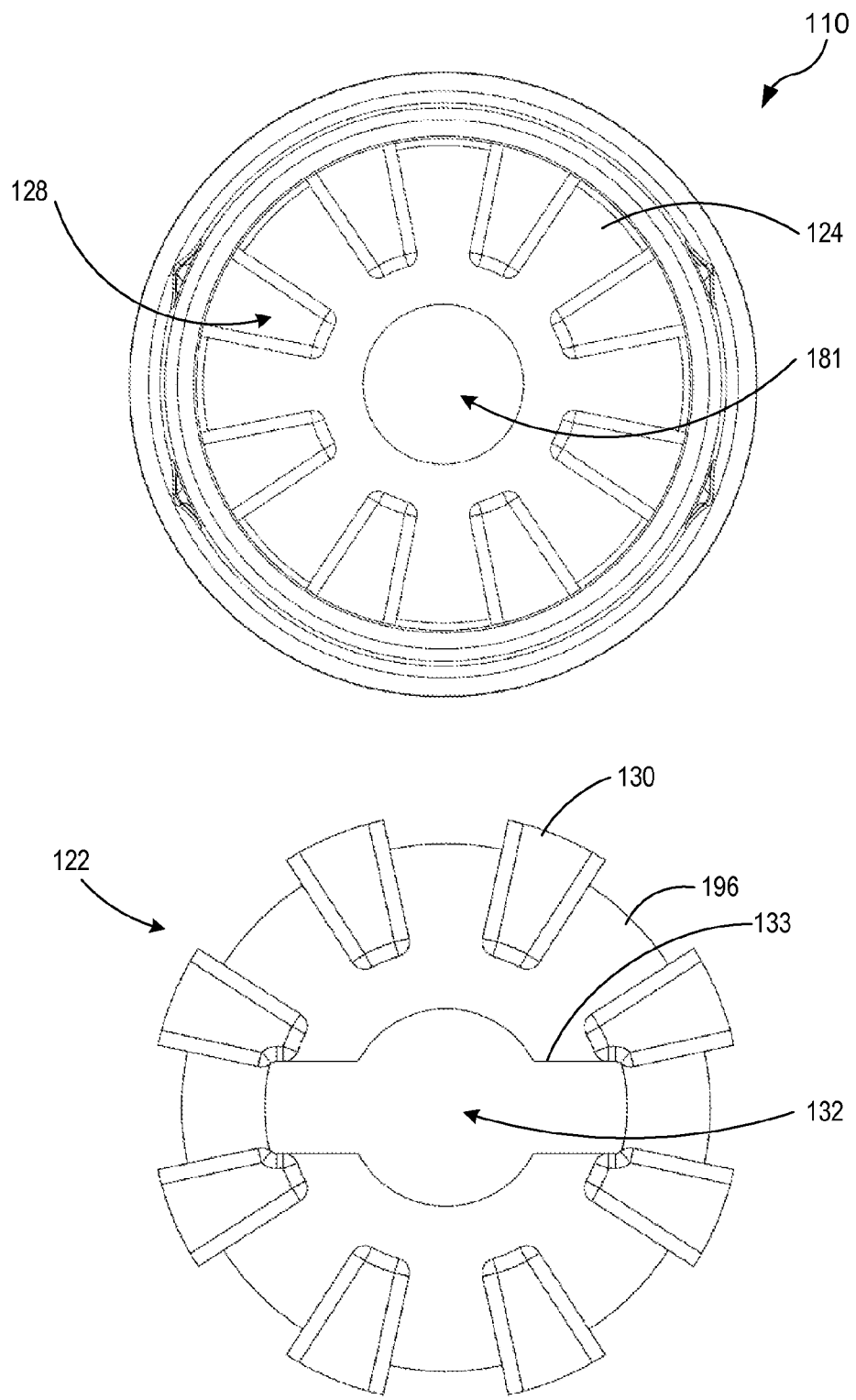
FIG. 8 is an illustrative view of an external face of a differential gear carrier and a view of a slider.

Referring now to FIG. 8, there is shown a view of the external face 124 of the differential gear carrier 110 and a view of the slider 122. In FIG. 8, the external face 124 and the slider 122 have been placed together for illustrative purposes. In some embodiments, the external face 124 may comprise a generally circular profile having the output shaft aperture 181. The external face 124 of differential gear carrier 110 may comprise at least one groove 128 which may extend radially and face axially toward the slider 122. In some embodiments, the external face 124 may comprise a plurality of carrier teeth having spaces between them forming the at least one groove 128.

The at least one groove 128 may be shaped to engage with the slider 122 to transfer torque between the differential gear carrier 110 and the slider 122. In some embodiments, the shape of the groove at least one groove 128 may comprise a wedge shape that tapers radially in width from an outer circular edge of the external face 124.

The slider 122 may comprise a generally cylindrical member having on one side a clutch plate 196 having a generally circular profile and comprising at least one tooth 130 configured to engage the at least one groove 128 of the external face 124 of the differential gear carrier 110. In some embodiments, the clutch plate 196 may face along the first output shaft 106

(as shown in FIG. 1) towards the differential gear carrier 110. The clutch plate 196 may comprise a plurality of grooves formed between a plurality of teeth, such as the at least one tooth 130. In some embodiments, the shape of the at least one tooth 130 may comprise a wedge shape that tapers radially in width from an outer circular edge of the clutch plate 196.

The at least one tooth 130 may be shaped to engage with the differential gear carrier 110 to transfer torque between the differential gear carrier 110 and the slider 122. In some embodiments, the at least one tooth 130 may fit into the at least one groove 128 to transfer torque to lock the first output shaft 106 (not shown) to the differential gear carrier 110. It should be recognized by a person of ordinary skill in the art that the at least one tooth 130 and the at least one groove 128 may comprise other shapes configured for transferring engaging and transferring torque. Those shapes may include circular grooves and circular teeth or square grooves and square teeth.

Figure 9A:
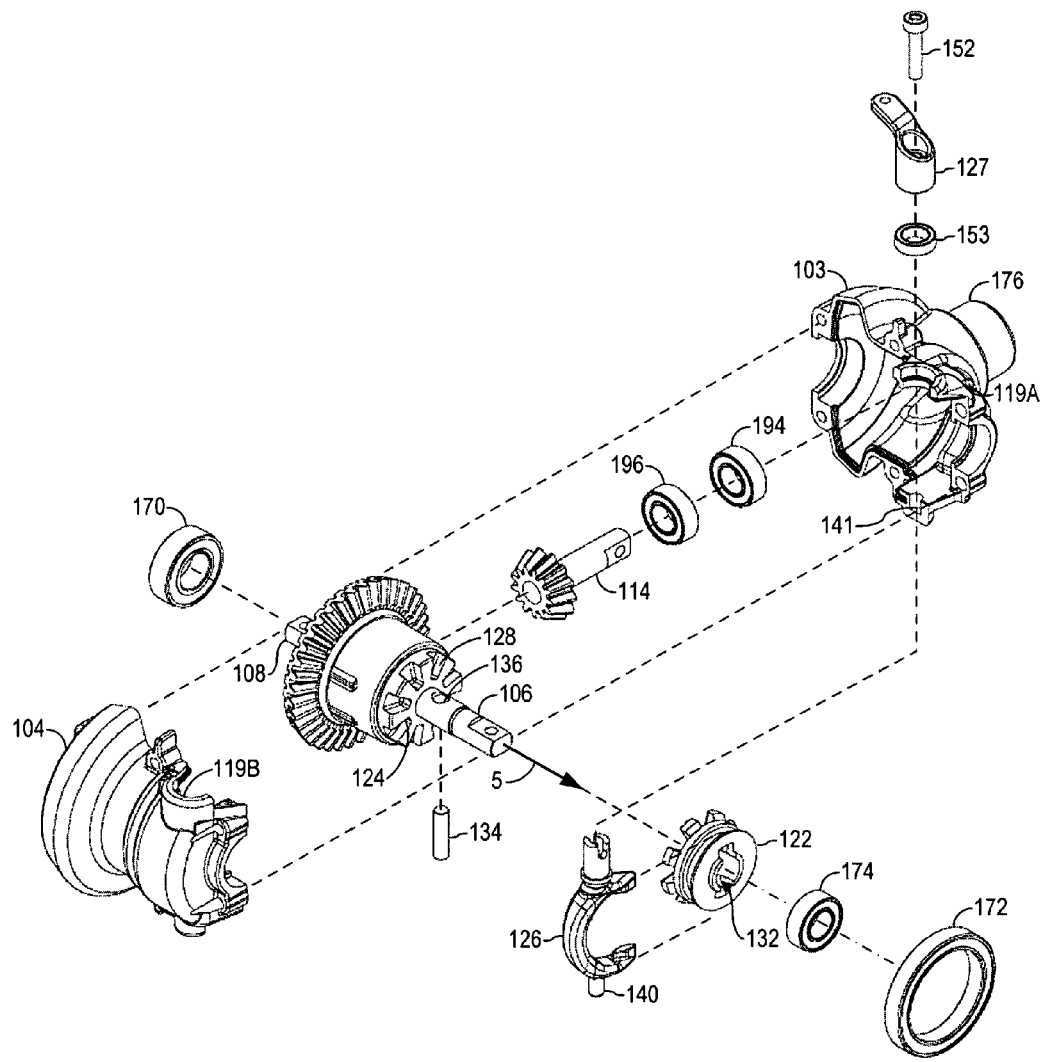
FIGS. 9A and 9B are a first and a second perspective exploded view of a locking clutch assembly.
Figure 9B:
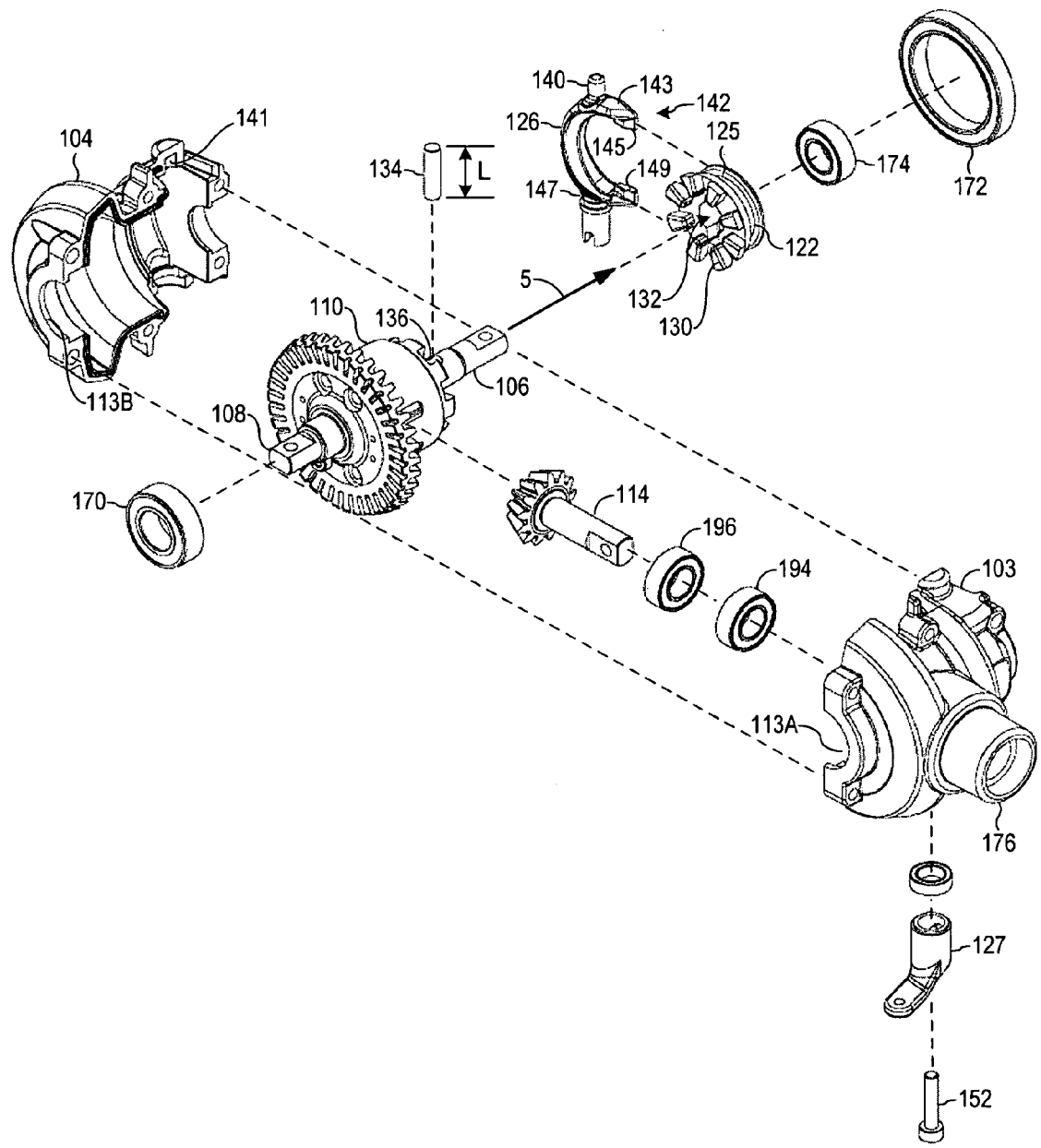

Turning now to FIGS. 9A and 9B, there are shown exploded perspective views of at least one embodiment of the locking clutch assembly 120. The slider 122 may be mounted coaxially along the axis 5 on the first output shaft 106. The at least one tooth 130 may be on the side of the slider facing the differential gear carrier 110. In some embodiments, the at least one tooth 130 may extend radially from the output shaft 106.

The slider 122 may be coupled to the first output shaft 106 by a torque transfer feature. In certain embodiments, the torque transfer feature may include the slider 122 having a first bore 132 configured to receive the first output shaft 106 and a traverse length L of a cross pin member, such as pin 134, which may be received by the first output shaft 106 in a second bore 136. The length L of the pin 134 may be received by the slider 122 such that the pin 134 transfers rotational torque from the first output shaft 106 to the slider 122. To optimize the transfer of torque between the pin 134 and the slider 122, the pin may be set within the second bore 136 so that a substantially equal portion of the pin 134 extends from either side of the second bore 136 (as shown in FIG. 1). In this configuration, the slider 122 may rotate at the same rate relative to the first output shaft 106 and may rotate at a different rate relative to differential gear carrier 110.

Referring to FIGS. 9A and 9B, the actuator 126 may comprise a semi-circular profile forming a general c-shape, which may be sized to fit around the slider 122 (as shown in FIG. 1). The actuator 126 may further comprise a first post 140 at a first end portion 142, which may mount the first end portion 142 of the actuator 126 to the outer housing 102 for rotation about the first post 140.

Figure 10:
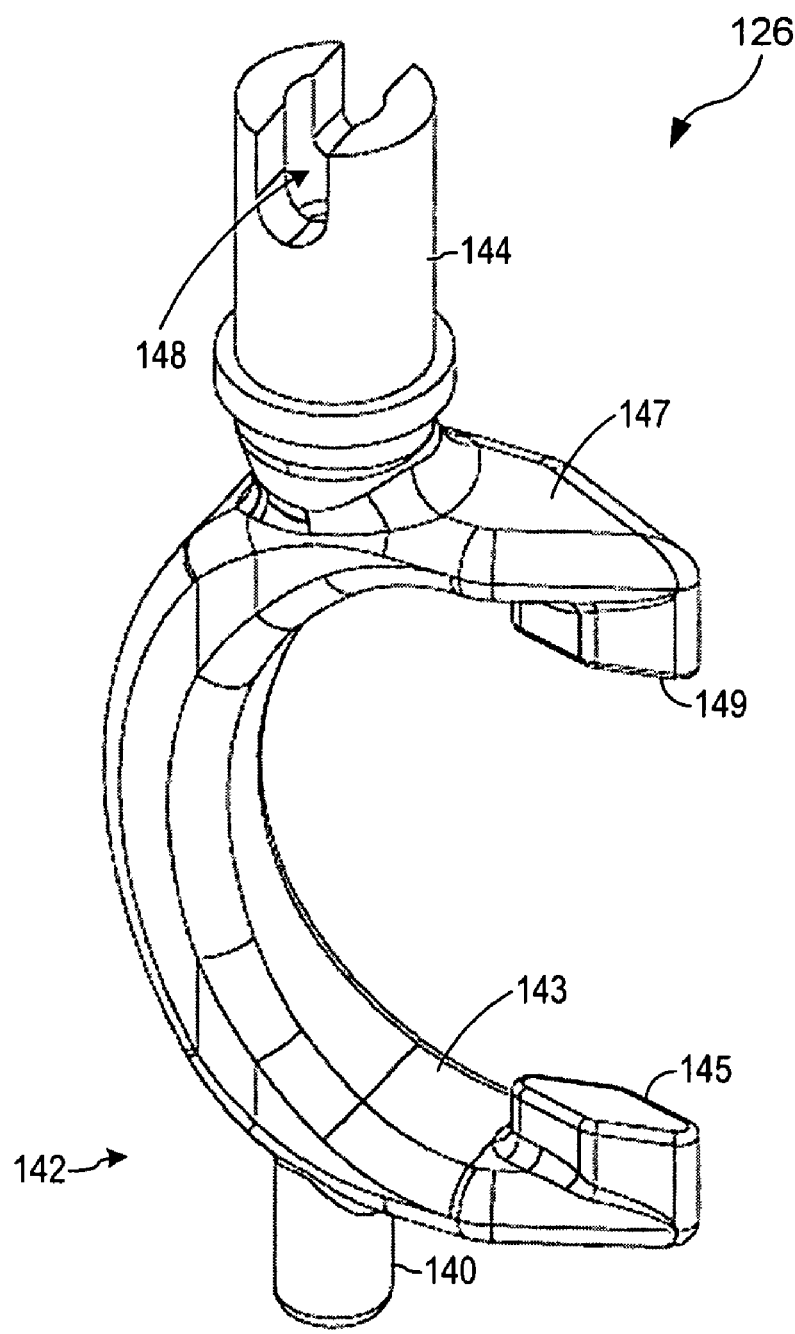
FIG. 10 is a perspective view of an actuator.

Referring now to FIG. 10, there is shown a perspective view of the actuator 126. The actuator 126 may comprise a first arm 143 having a first tab portion 145 and a second arm 147 having a second tab portion 149. The first arm 143 and the second arm 147 may oppose each other in the general c-shape of the actuator 126. The first tab portion 145 may extend from the first arm 143 toward the second arm 149, and the second tab portion 149 may extend from the second arm 147 toward the first arm 143.

The first tab portion 145 and the second tab portion 149 may each have a general parallelogram shape, such as a diamond shape, as shown in FIG. 10 for first tab portion 145. The first tab portion 145 the second tab portion 149 may comprise parallel opposing flat surfaces for making contact with the slider 122 to move the slider 122 along the first output shaft 106 (as described in FIGS. 13A-13F)

Referring back to FIG. 9B, in some embodiments, the first tab portion 145 and the second tab portion 149 may function as a guide for the slider 122. The first tab portion 145 and the second tab portion 149 may fit within a groove on the slider 122, which may function as a track for the first tab portion 145 and the second tab portion 149. As shown in FIG. 9B, the slider 122 may comprise an outer track 125 (as shown in FIG. 9B) to function as the groove which the first tab portion 145 and the second tab portion 149 make contact.

The actuator 126 may further comprise a second post 144, which may pivotably mount a second end portion 146 of the actuator 126 to the outer housing 102 for rotation about the second post 144. As shown in FIG. 10, the second post 144 may be further configured with a channel 148 formed from an inside surface of the second post 144 for receiving a portion of the lever member 127. The channel 148 may further comprise inner walls of the second post 144 for providing surfaces to engage the lever member 127.

Figure 11:
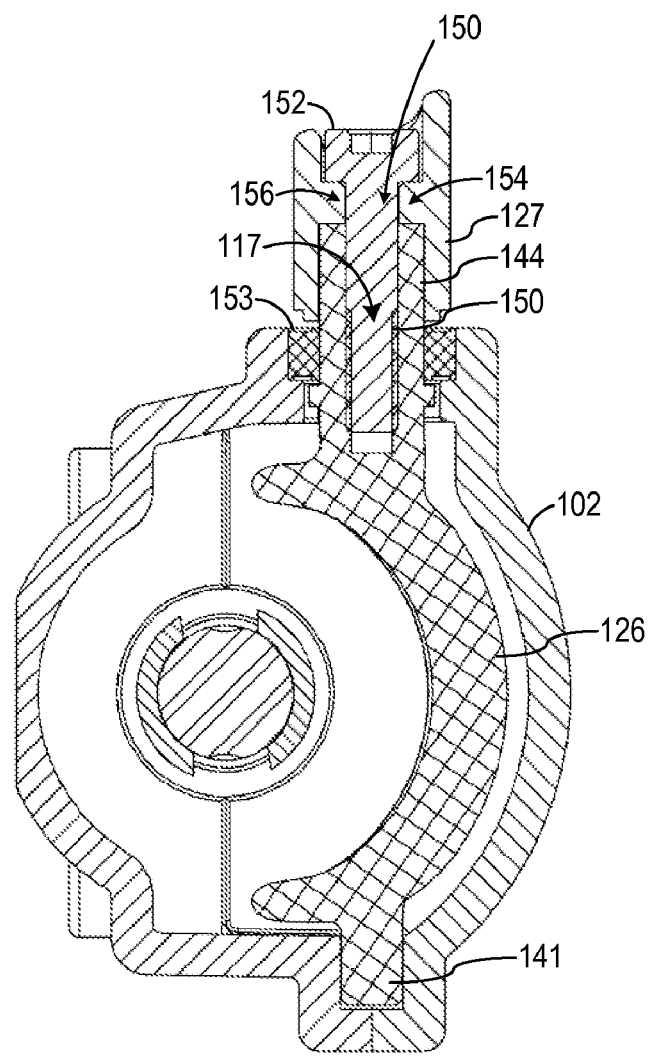
FIG. 11 is a sectional view of the a locking differential assembly taken along line 11-11 as referenced in FIG. 2E.
Figure 12:
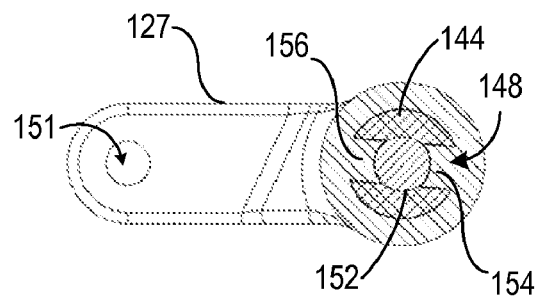
FIG. 12 is a sectional view of the a locking differential assembly taken along line 12-12 as referenced in FIG. 2E.

Referring now to FIGS. 11 and 12, there are shown cross-sectional views of the lever member 127 coupled to the actuator 126. As shown in FIG. 12, the inner surface of the second post 144 may further define a threaded bore 150 for receiving a first bolt 152 (also shown in FIGS. 1, 2B, 9A, and 9B) for coupling the lever member 127 to the outer housing 102 and actuator 126. The first bolt 152 may comprise a threaded portion for engaging the threaded bore 150 and a head portion for engaging a surface of the outer housing 102. The head portion may comprise a torque transfer feature, such as a hex-shaped bore or other polygonal shaped bore, for receiving a torque transfer member for rotating the bolt. It should be understood by a person of ordinary skill that other fasteners known in the art for coupling the lever member 127 to the outer housing 102 and actuator 126 may be utilized.

Referring to FIG. 11, the actuator 126 may pivotably mount to the outer housing 102. The first post 140 may fit into an inner surface of the outer housing 102 defining a recess 141, formed when the first part 103 and second part 104 are mated. The second post 144 may be received by the aperture 117, formed when the third edge surfaces 119a and 119b (shown in FIGS. 1 and 9A) of the first part 103 and the second part 104 are mated. An aperture bearing 153 (also shown in FIGS. 1, 9A, and 9B) may also be mounted on a ledge surface within the aperture 117.

Referring still to FIG. 11, a first lever tab 154 and a second lever tab 156 may extend from an inner surface of the lever member 127. There may be a clearance between the first lever tab 154 and the second lever tab 156 to allow the first bolt 152 to pass through the lever member 127 to engage the threaded bore 150 of the second post 144.

Referring to FIG. 12, the first lever tab 154 and the second lever tab 156 may engage walls of the channel 148 to provide surfaces for transferring the pivoting movement of the lever member 127 to the actuator 126. The first lever tab 154 may insert into a portion of the channel 148 and the second lever tab 156 may insert into a portion of the channel 148.

In some embodiments, the lever arm member 158 may comprise a connection feature 151, such as a bore, configured for coupling the lever member 127 to a mechanical linkage (not shown) for moving the arm member 158. It should be known to a person of ordinary skill in the art that other connection features may be applied to connect the lever arm member 158 to the mechanical linkage. Such mechanical linkage may form a portion of a motor or servo (not shown).

Referring back to FIGS. 9A and 9B, the first tab portion 145 and the second tab portion 149 may be shaped to engage the outer track 125 of the slider 122. The outer track 125 may comprise a generally circular groove on the outside edge of the slider 122 having walls within which the first tab portion 145 and the second tab portion 149 may ride as the slider 122 rotates with the first output shaft 106. When the actuator 126 is moved by the lever member 127, the first tab portion 145 and the second tab portion 149 may push against the walls of the outer track 125 to push the slider 122 into and out of the locked and open position.

Figure 13A:
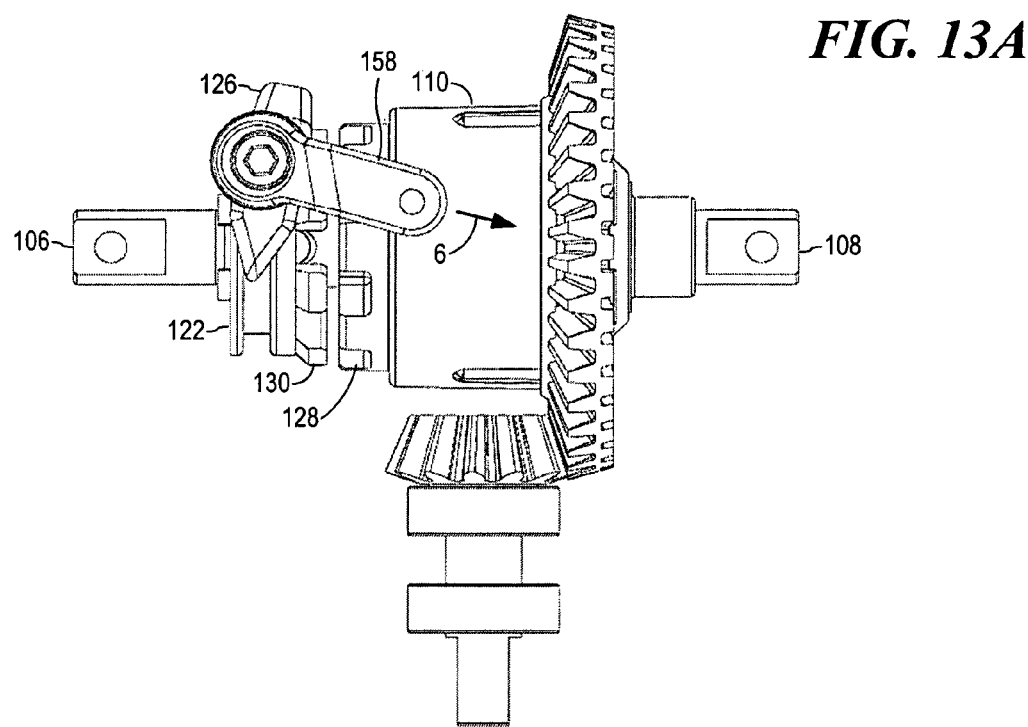
FIGS. 13A-E are side views with corresponding top views of a differential gear carrier and a slider in an open or unlocked position, as shown in FIGS. 13A and 13B, in an intermediate position, as shown in FIGS. 13C and 13D, and in a locked position, as shown in FIGS. 13E and 13F.
Figure 13B:
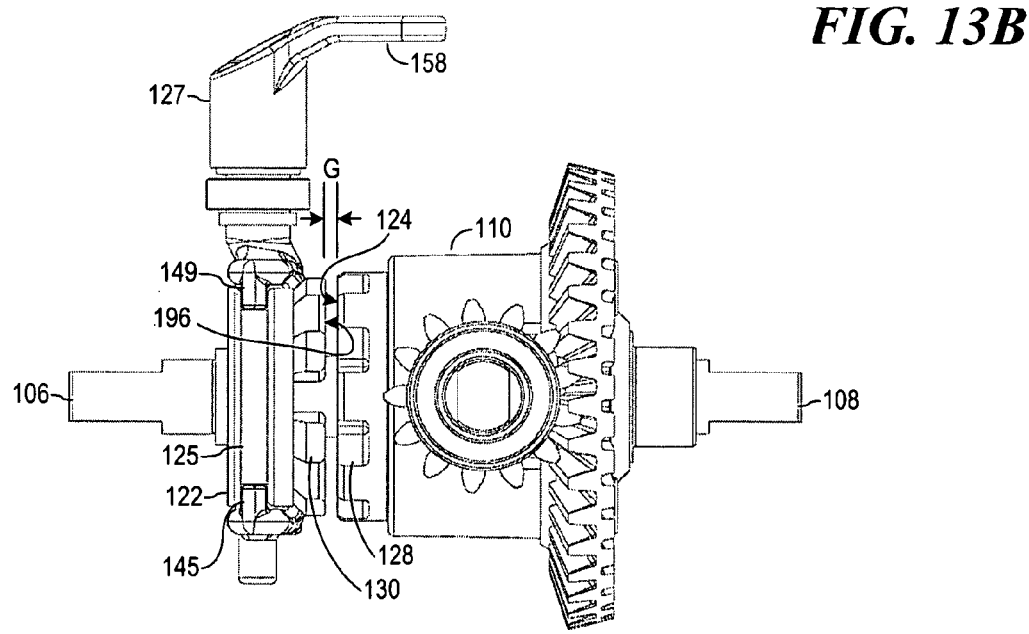
Figure 13C:
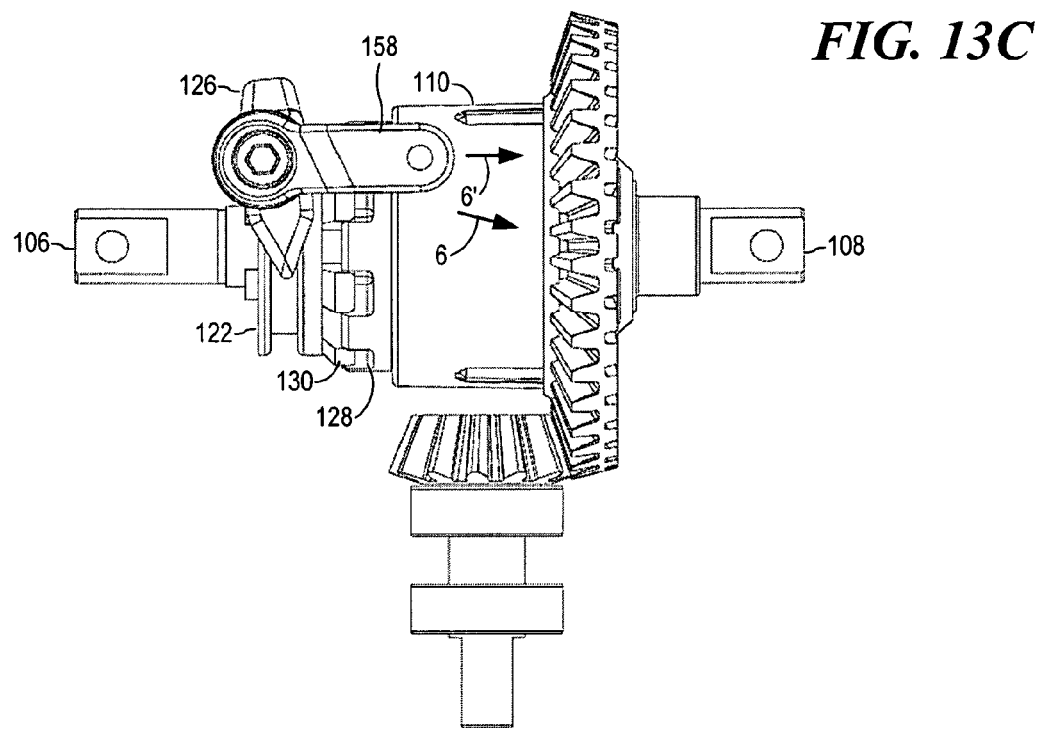
Figure 13D:
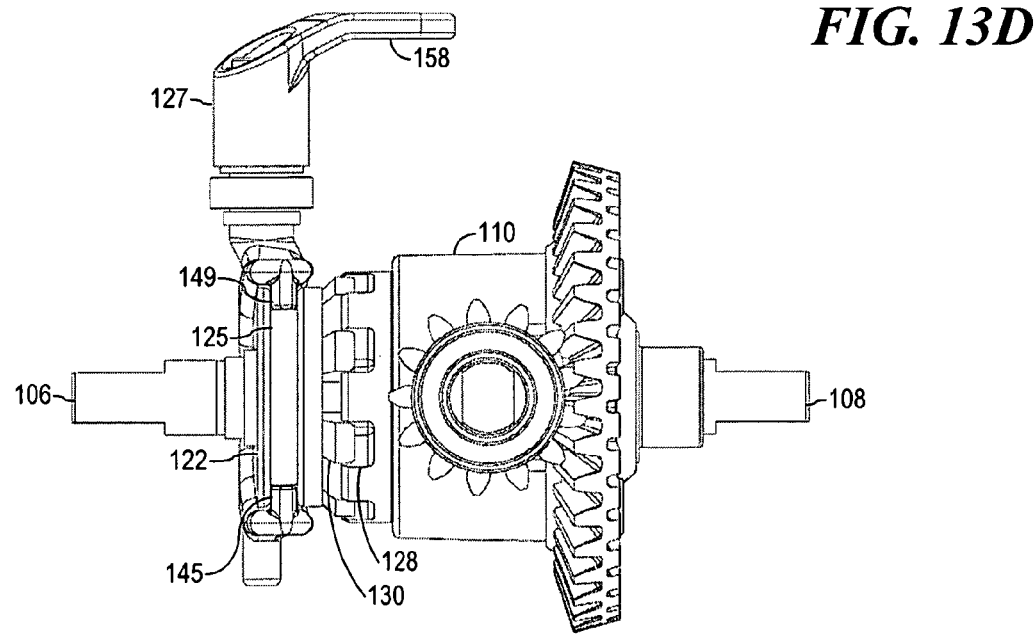
Figure 13E:
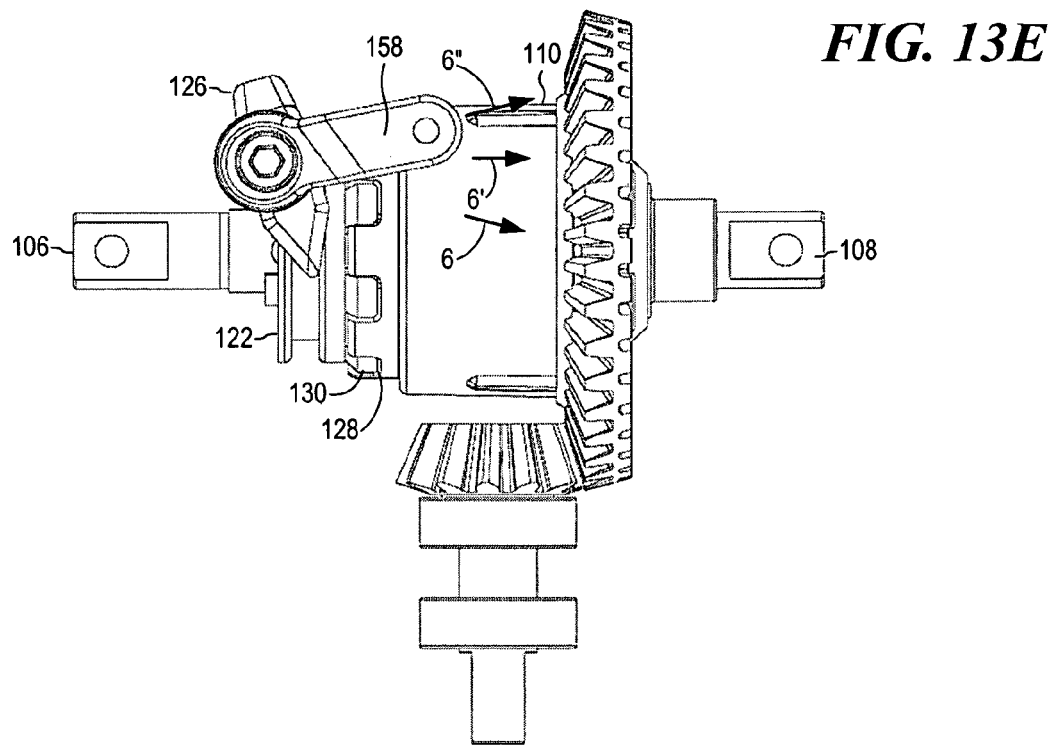
Figure 13F:
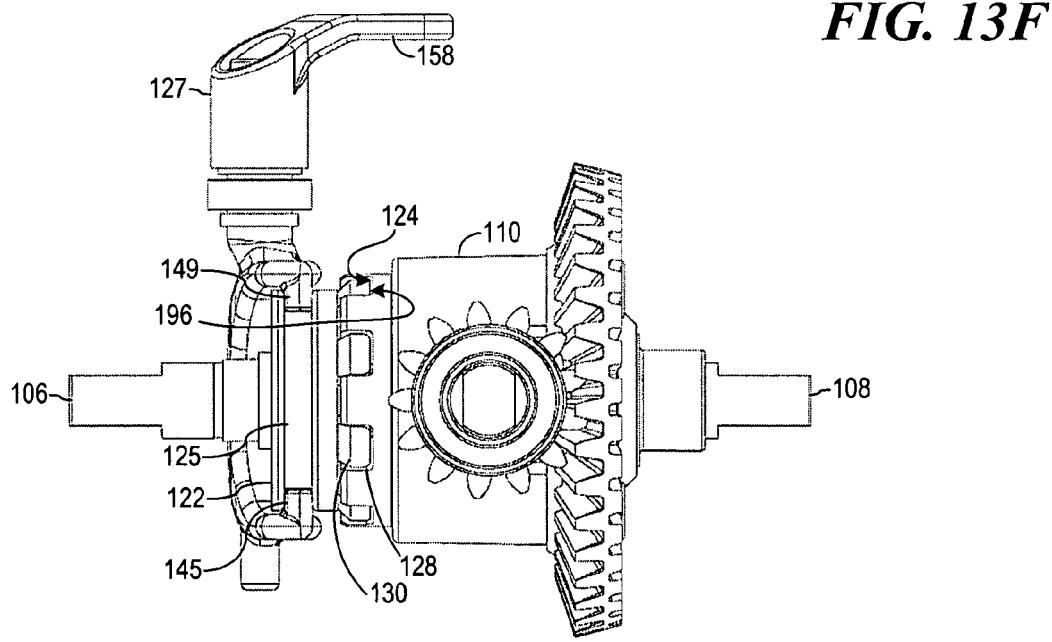

Referring now to FIGS. 13A through 13F, there are shown top views with corresponding side views of the differential gear carrier 110 and slider 122 in the open position, as shown in FIGS. 13A and 13B, in an intermediate position, as shown in FIGS. 13C and 13D, and in the locked position, as shown in FIGS. 13E and 13F. In each FIG. 13A-F, the first tab portion 145 and the second tab portion 149 of the actuator 126 may engage the slider 122 in the outer track 125 at opposing sides of the slider 122, as referenced in FIGS. 13B, 13D, and 13F. In the open position shown in FIGS. 13A and 13B, the slider 122 may rotate relative to the differential gear carrier 110. Throughout the transition between the open position to the locked position, the slider 122 may continue to rotate relative to the actuator 126. The first tab portion 145 and the second tab portion 149 of the actuator 126 may remain engaged with the outer track 125 throughout this transition, as shown in FIGS. 13B, 13D, and 13F.

Referring to FIGS. 13A and 13B, in the open position, the at least one tooth 130 of the slider 122 may be disengaged from the at least one groove 128 of the external face 124 of the differential gear carrier 110. The lever arm member 158 of the lever member 127 may be in an open setting with the lever arm member 158 lying generally along line 6. Between the external face 124 and the clutch plate 196 of the slider 122, there may be a gap G. In this configuration, the first output shaft 106 may rotate relative to the differential gear carrier 110 and the second output shaft 108.

Referring to FIGS. 13C and 13D, in an intermediate position, the at least one tooth 130 of the slider 122 may be partially engaged with the at least one groove 128, except that the lever arm member 158 may be moved from a setting the lever arm member 158 had in the open position along line 6 to a setting where the lever arm member 158 lies generally along line 6'.

Referring to FIGS. 13E and 13F, in the locked position, the at least one tooth 130 of the slider 122 may be fully engaged with the plurality of grooves 128. The lever arm member 158 may be moved to a locked setting along line 6' which may be removed for the setting of the lever arm member 158 along lines 6 and 6'. In some embodiments, there may be no gap between the external face 124 and the clutch face 196 of the slider 122.

In some embodiments, the at least one tooth 130 may have a slightly smaller size that the at least one groove 128. When in the locked position, the at least one tooth 130 may engage the at least one groove leaving a clearance between the at least one tooth 130 and the at least one groove. Only one wall of the at least one groove 128 may be in contact with the at least one tooth, while the slider 122 and differential gear carrier 110 are rotating under load.

As the at least one tooth 130 of the slider 122 approaches the at least one groove 128 of the external face 124 (shown in FIG. 1), the at least one tooth 130 may engage the at least one groove 128 so that the slider 122 and the differential gear carrier 110 are locked together and rotate at the same rate. In the open position and the intermediate position, the at least one groove 128 of the differential gear carrier 110 may be rotating at a different rate as the at least one tooth 130 of the slider 122. In the intermediate position, shown in FIG. 13C, the at least one tooth 130 of the slider 122 may be partially engaged with the at least one groove 128 of the external face 124. When the partial engagement occurs, the slider 122 and the differential gear carrier 110 may rotate together. In the locked position, the input drive torque from the drive pinion 114 (as described in FIG. 5) may be transferred to the first output shaft 106. The highest strength coupling between the slider 122 and the differential gear carrier 110 may be achieved when the at least one tooth 130 of the slider 122 is fully engaged with the at least one groove 128 of the differential gear carrier 110. Thus, in the locked position, the first output shaft 106, the slider 122, and the differential gear carrier 110 may be locked for synchronous rotation.

Because the second output shaft 108 is coupled through the cluster assembly 160 (as shown in FIG. 5) of gears in the differential gear carrier 110, locking the slider 122 to the differential gear carrier 110 also locks the second output shaft 108 to the first output shaft 106 so that each rotates at the same rate. Thus, the differential action of the differential gear carrier 110 may be disabled when the clutch plate 196 of the slider 122 and the external face 124 engage each other.

In some embodiments, the flat surfaces of each of the first tab portion 145 and the second tab portion 149 may provide a contact area for the actuator 126 to engage the slider 122, while the slider 122 is in the locked position and the open position. In the open position, at least a first flat surface of each of the first tab portion 145 and the second tab portion 149 may engage a first wall of the outer track 125. In the locked position, at least a second flat surface of the first tab portion 145 and the second tab portion 149 may engage a second wall of the outer track 125. The second flat surface may be an opposing parallel flat surface to the first flat surface in each of the first tab portion 145 and the second tab portion 149. It may be advantageous to present flat surfaces of the first tab portion 145 and the second tab portion 149 as contact surfaces with the outer track 125 in order to prevent or to slow wear between the slider 122 and the first tab portion 145 and the second tab portion 149.

Figure 14:
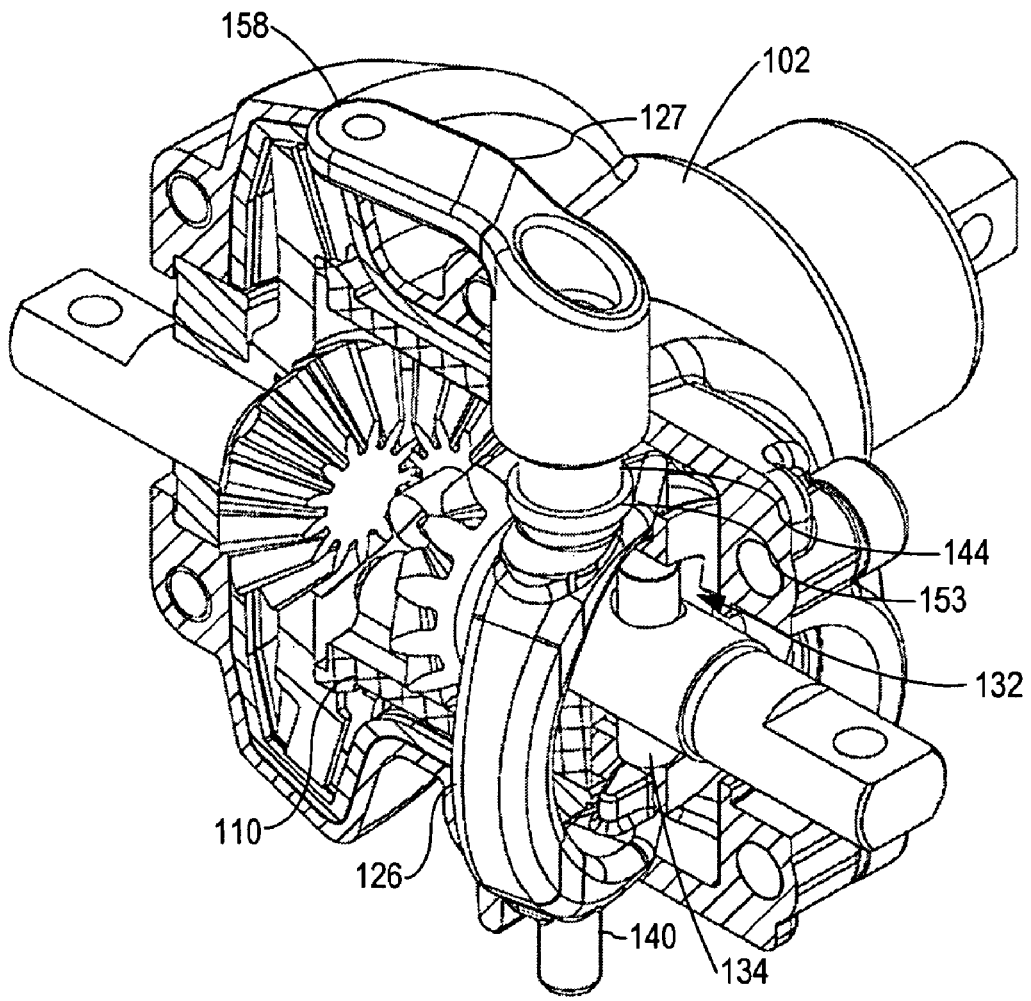
FIG. 14 is a perspective partial section view of a locking differential assembly taken along line 14-14 as referenced in FIG. 2F.
Figure 15:
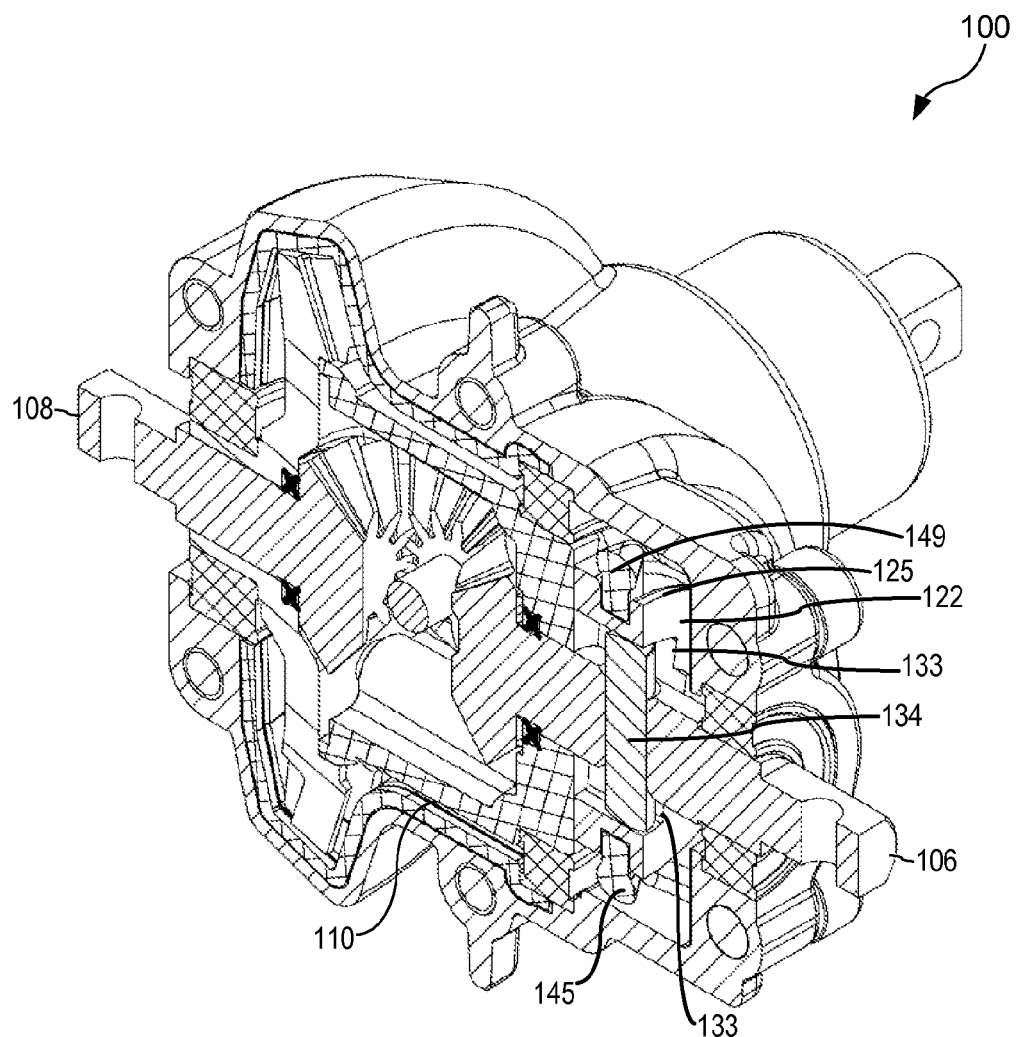
FIG. 15 is a perspective sectional view of a locking differential assembly taken along line 15-15 as referenced in FIG. 2F.
Figure 16:
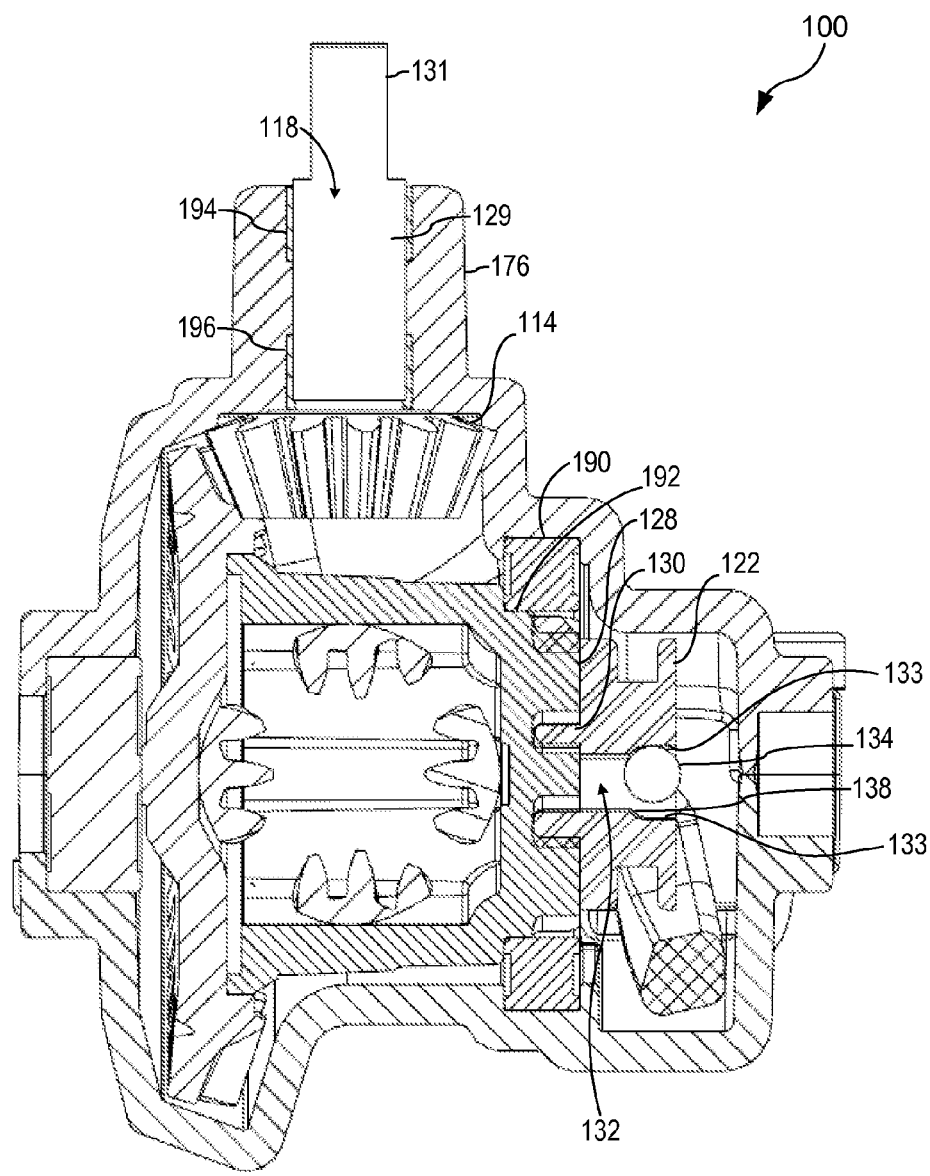
FIG. 16 is a sectional view of a locking differential assembly taken along line 16-16 as referenced in FIG. 2D.

Referring now to FIGS. 14, 15, and 16, there is shown cross-sectional views of the locking differential assembly 100 showing the interaction of the lever member 127 with the slider 122 to move the slider 122 between the open and locked positions.

In some embodiments, the first tab portion 145 and the second tab portion 149 of the actuator 126 may engage the slider 122 in the outer track 125 at opposing sides of the slider 122, as shown in FIGS. 13A-13F. In operation, the slider 122 may rotate with the first output shaft 106.

As shown in FIG. 14, the lever member 127 may be coupled to the second post 144 so that the lever member may rotate the actuator 126 about an axis formed by the second post 144 and the first post 140, which may be mounted to the outer housing 102. The aperture bearing 153 may be mounted to a portion of the second post 144 to help support the actuator 126 in rotation relative to the outer housing 102.

Referring to FIGS. 14 and 15, the pin 134 may transfer the rotation of the first output shaft 106 to the slider 122. The pin 134 may ride within the first bore 132 of the slider 122 as the slider 122 rotates in both the locked position and the open position. The slider 122 may translate over the first output shaft 106 relative to the pin 134 in the first bore 132, as the slider 122 is moved by the pivoting movement of the lever arm member 158 of the lever member 127.

To enter the locked position, the lever member 127 may move the first tab portion 145 and the second tab portion 149 of the actuator 126 toward the differential gear carrier 110, as described for FIGS. 13A-13F. Moving the lever arm member 158 may push the slider 122 toward the differential gear carrier 110 translating the slider 122 along the first output shaft 106. The pin may 134 translate through the first bore 132. In some embodiments, pivoting the lever arm member 158 (as shown in FIGS. 13A, C, and E) rotates the actuator 126 in the same direction and moves the slider 122 along the output shaft 106 towards the differential gear carrier 110. As shown in FIG. 16, in the locked position, the slider 122 may translate along its axis of rotation toward the at least one groove 128 to engage the at least one tooth 130 of the slider 122. The pin 134 may be located, in the locked position, on a side of the slider 122 opposite that side where the at least one tooth 130 is located.

The first bore 132 of the slider 122 may be shaped with a bore recess 133 to receive the first output shaft 106 having the pin 134 inserted in the second bore 136, as shown in FIG. 15. The bore recess 133 may comprise indentations in the inner surfaces of the first bore 132 configured to accommodate the length of the pin 134 as the output shaft 106 and pin 134 translate within the first bore 132. Referring to FIG. 16, the bore recess 133 of the first bore 132 may have a section shape that varies along an axial depth. In some embodiments, the section shape of the bore recess 133 may have a generally tapered shape with a locking feature 138. The section shape of the bore recess 133 may widen on the side of the first bore 132 that is away from the clutch plate 196 (shown in FIG. 1). As the slider 122 is moved by the actuator 126 toward the differential gear carrier 110 to the locked position, the slider 122 passes over the pin 134 so that the pin 134 translates relative to the first bore 132 to a locking feature 138 in the bore recess 133 of the first bore 132. The locking feature 138 may comprise a lip, a notch, an indentation or groove which may prevent the at least one tooth 130 of the slider 122 from disengaging from the at least one groove 128 of the external face 124 of the differential gear carrier 110 while the differential gear carrier 110 is rotating under load.

Referring now to FIG. 17, there is shown a cross-sectional view showing the mounting of the differential gear carrier 110 and locking clutch assembly 120 within the outer housing 102. In some embodiments, a first bearing 170 (also shown in FIGS. 1, 4, 5, 9A, and 9B) may mount to the outer housing 102 on a cylindrical portion of the ring gear 112 which extends along the second output shaft 108 and away from the carrier housing 111. The first bearing 170 may mount between a radially extending portion of the ring gear 112 and an inner ledge portion of the second aperture 116 of the outer housing 102. In some embodiments, the first bearing 170 may provide support to the second output shaft 108 to prevent stress on the gear box within the differential gear carrier 110.

In some embodiments, a second bearing 172 may mount a portion of the carrier housing 111 to the outer housing 102. The second bearing 172 may be positioned to mount on an outer portion of the carrier housing 111 between the ring gear 112 and the external face 124 of the carrier housing 111, as shown in FIG. 1. In some embodiments, the second bearing may surround at least a portion of the external face 124. The second bearing 172 may be further mounted between an inner lip surface 190 formed on an inner surface of the outer housing 102 and an outer ridge surface 192 (also shown in FIG. 4) formed from an outer surface of the carrier housing 111. It may be advantageous to place the second bearing 172 in this position to prevent the necessity for having the carrier housing 111 extend past the locking clutch assembly 120 along the first output shaft 106.

Referring further to FIG. 17, a third bearing 174 (also shown in FIGS. 1, 2A, 9A, and 9B) may mount on a portion of the first output shaft 106 to outer housing 102. In some embodiments, the third bearing 174 may further mount to an inner ledge surface in the aperture 115 (also shown in FIGS. 2A and 2B). The third bearing 174 may provide support to the first output shaft 106 to prevent stress on the gear box within the differential gear carrier 110.

Referring back to FIG. 16, the drive pinion 114 may be mounted to an extension portion 176 (also shown in FIGS. 1, 2A, 2B, 9A, and 9B) of the outer housing 102. The extended portion 176 may comprise a generally cylindrical member configured to house the shaft portion 129 of the drive pinion 114 such that the connection feature 131 extends from the fourth aperture 118.

The shaft portion 129 of the drive pinion 114 may be mounted within the extended portion by a first drive bearing 194 and a second drive bearing 196. The first drive bearing 194 and the second drive bearing 196 may each mount to inner ridge surfaces of the fourth aperture 118. The second drive bearing 196 may be set against a portion of the drive pinion 114 that extends radially from the shaft portion 129. In some embodiments, the first drive bearing 194 and the second drive bearing 196 may support the shaft portion 129 in rotation and prevent misalignment of the gear portion of the drive pinion 114 from the ring gear 112.

Referring back to FIG. 3, the differential locking assembly 100 may be used in tandem with a second differential locking assembly 100'. This arrangement may be useful with an all wheel drive vehicle, such as toy model vehicle 10. The second differential locking assembly 100' may operate similarly to the differential locking assembly 100 and may be identical as well. The differential locking assembly 100' may be mounted coaxially with a third model vehicle wheel 20' and a fourth model vehicle wheel 30', which may be mechanically linked to a third axle portion 22' through a fourth linkage 24' and to a fourth axle portion 24' through a fifth linkage 34' to a third output shaft 106' and a fourth output shaft 108', respectively. A second drive shaft 40' from the transmission 50 may be mechanically linked through a sixth linkage 42' to a second shaft portion 129' for providing an input drive torque to the second differential locking assembly 100'.

Figure 18:
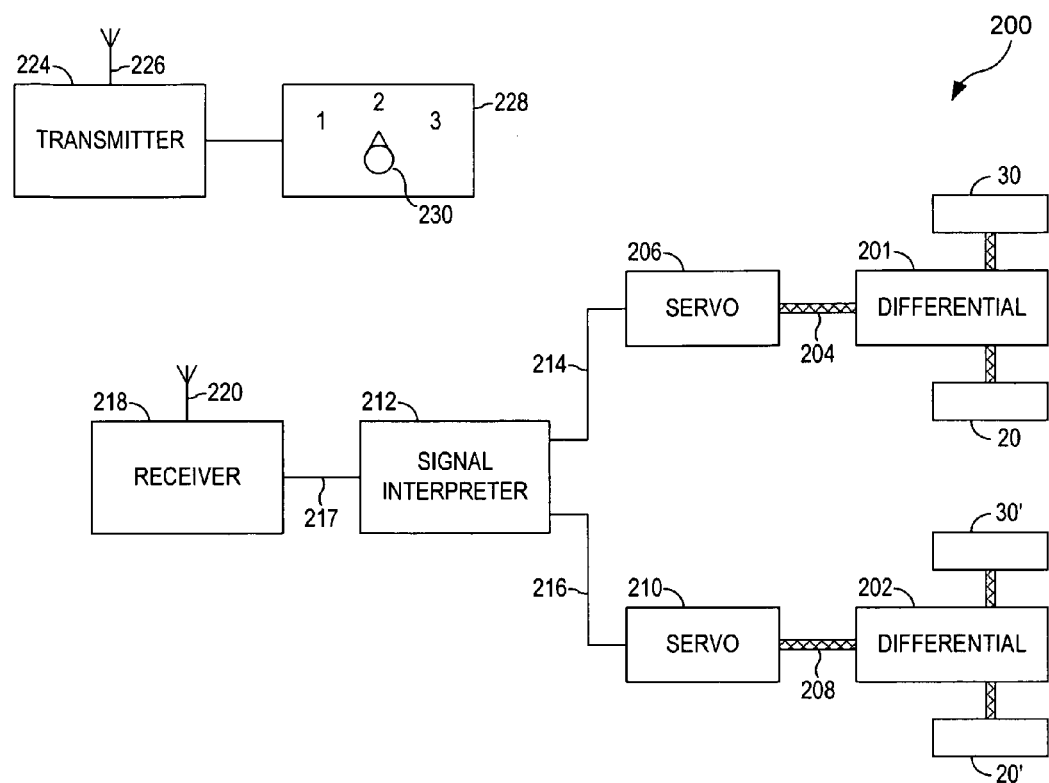
FIG. 18 is a schematic diagram of a system for controlling one or more locking differentials.

Referring now to FIG. 18, there is shown a schematic diagram of at least one embodiment for a system 200 for controlling one or more locking differentials. The system 200 may comprise a first locking differential assembly 201 and a second locking differential assembly 202, which may, in some embodiments, each be constructed in the same manner as locking differential assembly 100, as described previously. In some embodiments, the first locking differential assembly 201 and the second locking differential assembly 202 may correspond to a front differential assembly coaxially mounted to a front pair of driven wheels 20 and 30 (as also shown in FIG. 3) and rear differential assembly coaxially mounted to a rear pair of driven wheels 20' and 30' (as also shown in FIG. 3), respectively, in a toy model vehicle.

The first locking differential assembly 201 may be mechanically linked, through a first linkage 204, to a first servo 206, which may comprise a motor or other device known in the art for controlling mechanical movement. The first servo 206 may be configured to receive an electrical signal to output a mechanical response. The mechanical response may be coupled to first linkage 204 to move a portion of the first locking differential assembly 201, such as the lever member 127 of locking differential assembly 110 (as shown in FIG. 2A). The servo 206 may output the mechanical response to an input signal in order to move the locking differential assembly 201 into and out of a locked and an open position, as described previously, for example, for locking differential assembly 100.

Similarly, the second locking differential assembly 202 may be mechanically linked, through a second linkage 208, to a second servo 210, which may comprise a motor. The second servo 210 may output a mechanical response to an input signal in order to move the locking differential assembly 202 into and out of a locked and an open position, as described previously, for example, for locking differential assembly 100.

The first servo 206 and second servo 210 may be each connected to a controller, such as signal interpreter 212, via a first connection 214 and a second connection 216, respectively. In some embodiments, the signal interpreter 212 may be configured for controlling and coordinating the opening and locking of the first locking differential assembly 201 and the second locking differential assembly 202.

The signal interpreter 212 may be connected, via a third connection 217, to a receiver 218. The receiver 218 may be configured to receive instructions or commands. In some embodiments, the receiver 218 may include an antenna component 220 for receiving wireless signals from a transmitter 224. The antenna component 220 may comprise an antenna or other device for receiving and transmitting wireless signals known by a person of ordinary skill in the art.

In some embodiments, the transmitter 224 may comprise a handheld device for transmitting and receiving instructions or commands to the signal interpreter 224 via the receiver 218. An antenna component 226 on the transmitter 224 may be configured to receive and transmit wireless signals. In some embodiments, the transmitter 224 may communicate with the receiver 218 to receive data on the status of the differential locking assemblies 201 and 202. For instance, the transmitter may receive indications of whether the servos 206 and 210 are powered, or indications of what position, locked or unlocked, the differential locking assemblies 201 and 202 are in.

The transmitter 224 may further comprise a user interface 228. In some embodiments, the user interface 228 may comprise analog controls, such as buttons or knobs for varying output signal for controlling the positions of the first locking differential assembly 201 and second locking differential assembly 202 It should be understood by a person of ordinary skill in the art that the functions accomplished here by wireless means may be accomplished through wired means using known methods and components. Further, the use of analog controls and signals may be replaced by digital controls and signals by methods and components readily known in the art to a person of ordinary skill.

The signal interpreter 212 may be further configured to receive a first signal from the transmitter 224 so that the first locking differential assembly 201 and the second locking differential assembly 202 may be locked and unlocked sequentially. The user interface 228 of the transmitter 224 may comprise a switch 230 having a first position 1, a second position 2, and third position 3. Each position may correspond to a command generated as the first signal to the receiver 218. The first position 1 may correspond to a first output condition where both the first locking differential assembly 401 and the second locking differential assembly 202 are unlocked. This configuration may be a default position. The second position 2 may correspond to a second output condition, where only the first locking differential assembly 201 is locked. In some embodiments, the first locking differential assembly 201 may be the front differential assembly coupled to the front axle of a toy model vehicle. The third position 3 on the switch of the transmitter 224 may correspond to a third output condition where both the first locking differential assembly 201 and the second locking differential assembly 202 are locked.

The receiver may relay the first signal to the signal interpreter 218. In some embodiments, a single pulse width modulation (PWM) channel of proportional control may be used so that the first locking differential assembly 201 and the second locking differential assembly 202 may be controlled sequentially.

The signal interpreter 212 may be further configured to interpret the first signal to generate a first command signal to output to the first servo 206 and to generate a second command signal to output to the second servo 208. The signal interpreter may output the first command signal and the second command signal to the first locking differential assembly 201 and the second locking differential assembly 202, respectively, depending on the pulse width of the input signal. There may be three possible output conditions which correspond to three ranges of input pulse width, an upper range, a middle range, and a lower range, within the first signal. Shown below in Table 1 is an illustrative listing for one embodiment of pulse width ranges for the input pulse width corresponding to the output condition comprising output pulse widths of sequential signals transmitted to the first servo (referenced as the "front output") and the second servo (referenced as "rear output").

TABLE 1

Logic table for Signal Interpreter input/output pulse width

| Pulse Width | Input (ms) | Front Output (ms) | Rear Output (ms) |
|---|---|---|---|
| 1 (lower) | 1.00 − 0.135 + 0.312 | 0.992 + 0.032 | 0.992 + 0.032 |
| 2 (middle) | 1.50 − 0.189 + .260 | 0.992 + 0.032 | 1.984 + 0.032 |
| 3 (upper) | 2.00 − 0.239 + 0.176 | 1.984 + 0.032 | 1.984 + 0.032 |

Figure 19:
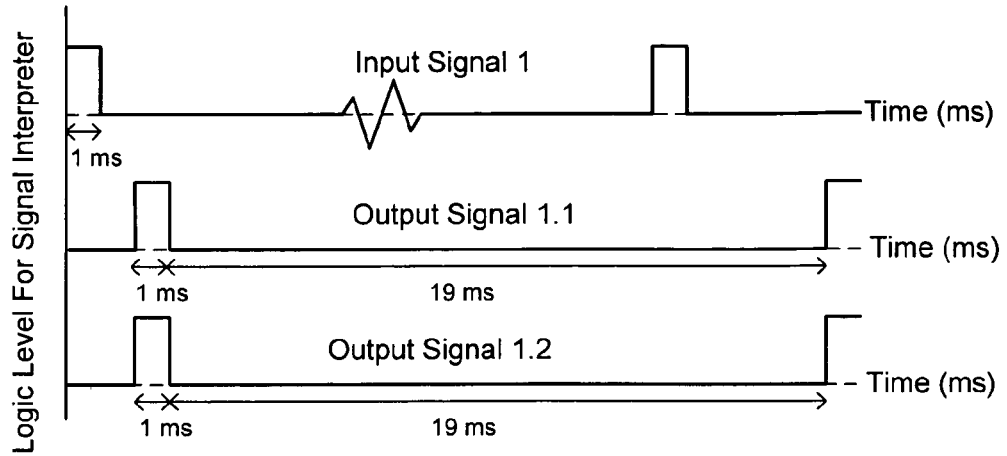
FIG. 19 is a signal graph for input pulse widths in a lower range.
Figure 20:
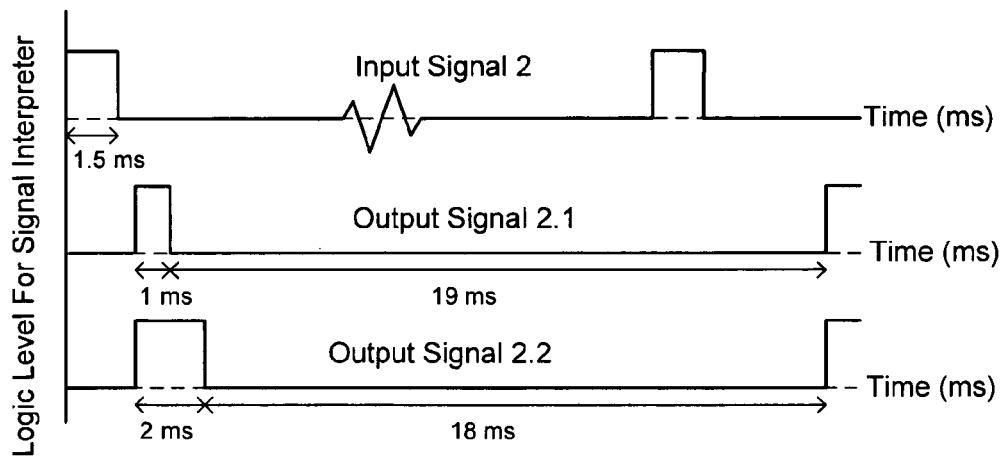
FIG. 20 is a signal graph for input pulse widths in a middle range.
Figure 21:
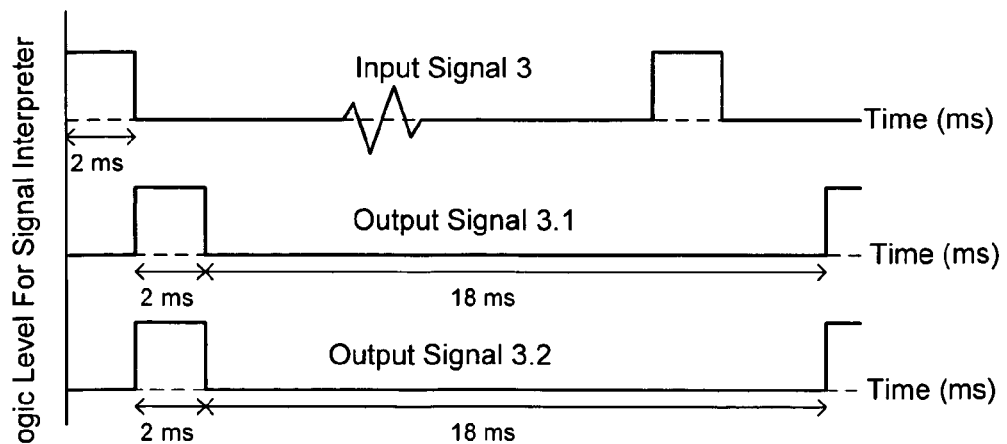
FIG. 21 is a signal graph for input pulse widths in an upper range.

Referring now to FIGS. 19, 20, and 21, there are shown example signal graphs for input pulse widths corresponding to the lower range, the middle range, and the upper range input pulse widths with their corresponding output signals generated by the signal interpreter 212 (shown in FIG. 18). As shown in FIG. 19, the signal interpreter 212 may be configured to receive input signal 1 having a pulse width of 1 ms. According to Table 1, an input signal of 1 ms may be within the lower range of pulse width, corresponding to the first output condition. Signal interpreter 212 may output an output signal 1.1, having a pulse width of 1 ms, and an output signal 1.2, having a pulse width of 1 ms. The servos 206 and 210, shown in FIG. 18, may be configured to receive the output signal 1.1 and the output signal 1.2, respectively, and to respond by unlocking the first locking differential assembly 201 and unlocking the second locking differential assembly 202.

As shown in FIG. 20, the signal interpreter 212 may be configured to receive input signal 2 having a pulse width of 1.5 ms. According to Table 1, an input signal of 1.5 ms may be within the middle range of pulse width, corresponding to the second output condition. Signal interpreter 212 may output an output signal 2.1, having a pulse width of 1 ms, and an output signal 2.2, having a pulse width of 2 ms. The servos 206 and 210, shown in FIG. 18, may be configured to receive the output signal 2.1 and the output signal 2.2, respectively, and respond by locking the first locking differential assembly 201 and unlocking the second locking differential assembly 202.

As shown in FIG. 21, the signal interpreter 212 may be configured to receive input signal 3 having a pulse width of 2.0 ms. According to Table 1, an input signal of 2.0 ms may be within the upper range of pulse width, corresponding to the third output condition. Signal interpreter 212 may output an output signal 3.1, having a pulse width of 2 ms, and an output signal 3.2, having a pulse width of 2 ms. The servos 206 and 210, shown in FIG. 18, may be configured to receive the output signal 3.1 and the output signal 3.2, respectively, and respond by locking the first locking differential assembly 201 and locking the second locking differential assembly 202.

The assignment of one particular output condition to one range of input pulse width and the order of transmission of sequential signals may be arbitrary and may be changed according to methods and components known to a person of ordinary skill in the art.

It should be understood by a person of ordinary skill in the art that either the first locking differential assembly 201 or the second locking differential assembly 202 may be excluded from the system 200 or disabled temporarily such that the system 200 may operate with only one functioning locking differential assembly.

It should also be understood by a person of ordinary skill in the art that signals other than PWM may be used and that the ranges are frequencies chosen to represent a particular condition may be arbitrary. Other signals might include those based on frequency modulation, TTL, or any other suitable digital or analog signal.

The locking differential assembly 100, as shown in certain embodiments in FIG. 1 and in its various components herein described, may be manufactured from an injection molding of glass fiber reinforced nylon, for instance DuPont® Zytel® or other suitable thermoplastics well known in the art. In some embodiments, the differential gear carrier 110, carrier housing 111, and lever member 127 may be constructed from a thermoplastic. It should be recognized by a person of ordinary skill in the art that other materials suitable for construction of such components may be utilized including powder metal or other alloys suitable for injection molding. In some embodiments, the cluster assembly 160 of gears, the supports, and various bearings may be constructed from steel. Further, the x-rings, gaskets, and other wear and sealing components may be constructed from silicone rubber or other suitable rubber material. Other methods of forming materials into the components herein described may be utilized according to the knowledge of a person of ordinary skill in art. Those methods include casting or machining aluminum, steel or other suitable material.

Having thus described the present invention by reference to certain of its embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

We claim:

1. A locking differential assembly comprising:
   a differential gear carrier having a first output shaft, wherein the differential gear carrier comprises an external face of the differential gear carrier facing away from the differential gear carrier along the first output shaft;
   a locking clutch assembly mounted on the first output shaft, wherein the locking clutch assembly comprises a slider member configured to move along the first output shaft so that the slider member engages the external face to disable a differential action of the differential gear carrier; and
   a pin extending from the first output shaft to rotationally couple the first output shaft to the slider member, wherein the slider is configured to receive the pin in a pin slot for transferring torque from the shaft to the slider member.

2. The locking differential assembly of claim 1, wherein the slider member of the locking clutch assembly is mounted for movement between a first position disengaged from the external face and a second position engaged with the external face for rotation with both the differential gear carrier and the first output shaft.

3. The locking differential assembly of claim 1, wherein the locking clutch assembly comprises:
   a pivoting actuator having at least one guide for moving the slider member between the first position and the second position; and
   wherein the slider member has an outer track for receiving the guide of the actuator.

4. The locking differential assembly of claim 1, wherein a section shape of the pin slot varies along an axial depth to prevent the plurality of teeth of the slider from disengaging from the plurality of grooves of the differential gear carrier.

5. A locking differential for disabling the differential action between two or more driven wheels of a toy model vehicle, the locking differential comprising a differential gear carrier mounted coaxially on a first output shaft along a first axis, wherein the differential gear carrier provides for speed variations between the first output shaft and a second output shaft, which is rotationally coupled to the differential gear carrier along the first axis opposite the first output shaft, the locking differential further comprising:
   a plurality of grooves formed by carrier teeth on an external face of the differential gear carrier, the plurality of grooves facing axially away from the differential gear carrier;
   a slider mounted on and slideably coupled to the first output shaft, wherein the slider has at least one slider tooth extending along the first output shaft toward the plurality of grooves of the differential gear carrier, and the at least one slider tooth is shaped to transmit torque between the differential carrier and the slider;
   a first support bearing mounted on the differential gear carrier, wherein the support bearing surrounds at least a portion of the external face of the differential gear carrier, and wherein the first support bearing is mounted on an outer ridge surface of the external face;
   wherein the slider may be configured to move along the first output shaft to engage the differential gear carrier so as to lock the first output shaft to the differential gear carrier;
   wherein the slider is coupled to the first output shaft by a pin positioned within the first output shaft and within a pin slot of the slider such that the pin axially moves relative to the pin slot as the slider moves along the first output shaft, and wherein a section shape of the pin slot varies along an axial depth to prevent the plurality of teeth of the slider from disengaging from the plurality of grooves of the differential gear carrier.

6. The locking differential of claim 5, wherein the plurality of grooves extend radially from the first output shaft.

7. The locking differential of claim 6, wherein the at least one tooth of the slider extends radially from the first output shaft.

8. The locking differential of claim 7, wherein the at least one tooth comprises generally a wedge shape that expands radially from the first output shaft.

9. The locking differential of claim 7 further comprising a slider actuator coupled to the slider for moving the slider along the first output shaft.

10. The locking differential of claim 9, further comprising:
a first control system operationally connected to at least the first servo, wherein the first control system is configured to receive a first output signal from a second control system, the first output signal configured to provide at least a command to the servo to move the slider to a locked position; and
wherein the first control system is configured to interpret the first output signal and generate and transmit a first command signal to the servo and generate and transmit a second command signal.

11. The locking differential of claim 9, further comprising a servo operationally connected to the slider, wherein the servo is configured to receive electrical commands for controlling the slider.

12. A locking differential for a model vehicle comprising:
a differential gear carrier mounted for rotation about a drive axis;
a drive shaft coupled to the differential gear carrier for driving the differential gear carrier about the drive axis;
a differential clutch plate mounted to the exterior of the differential gear carrier for rotation with the differential gear carrier about the drive axis;
an output shaft extending from the differential gear carrier through the differential clutch plate, the output shaft mounted for rotation about the drive axis and for rotation relative to the differential gear carrier;
an output shaft clutch plate mounted for rotation with the output shaft, the output shaft clutch plate mounted for movement between a first position disengaged from the differential clutch plate and a second position engaged with the differential clutch plate for rotation with both the differential clutch plate and the output shaft;
a cross pin for coupling the output shaft clutch plate to the output shaft for rotation with the output shaft, wherein the cross pin inserts in a first bore of the output shaft and is configured to engage a recess in a second bore in the output shaft clutch plate; and
wherein the output shaft clutch plate, when placed in the second position, couples the differential clutch plate, differential gear carrier and output shaft for synchronous rotation.

13. The locking differential for a model vehicle of claim 12, wherein the cross pin moves along an axial depth of the recess in the second bore as the output shaft clutch plate moves between the first and the second position, and wherein a section shape of the recess in the second bore varies along the axial depth to prevent disengagement of the second clutch plate from the differential clutch plate while the differential clutch plate, differential gear carrier and output shaft are in synchronous rotation.

14. The locking differential for a model vehicle of claim 13, further comprising an actuator for moving the output shaft clutch plate between the first and second positions.

15. The locking differential for a model vehicle of claim 14, wherein the output shaft clutch plate moves axially along the output shaft, between the first and second positions.

16. The locking differential for a model vehicle of claim 15, further comprising a housing enclosing at least a portion of the differential gear carrier, the housing supporting the gear carrier for rotation relative to the drive shaft and about the drive axis.

17. The locking differential for a model vehicle of claim 16, wherein the actuator is coupled between the housing and the output shaft clutch plate.

18. The locking differential for a model vehicle of claim 17, wherein the output shaft clutch plate comprises an outer track extending radially into at least a portion of the perimeter of the output shaft clutch plate and the actuator comprises an actuator guide extending at least partially into the outer track for moving the output shaft clutch plate between the first and second positions.

19. The locking differential for a model vehicle of claim 18, wherein the actuator is pivotally mounted to the housing, and wherein the actuator guide extends from the pivotal axis of the actuator, and the actuator guide is at least partially disposed within the housing.

20. The locking differential for a model vehicle of claim 19, wherein the actuator further comprises a stem extending from the housing, the stem being rotatable to pivot the actuator guide to move the output shaft clutch plate between the first and second positions.

21. The locking differential for a model vehicle of claim 20, further comprising:
a lever arm extending radially from the actuator stem; and
a linear actuator coupled to the lever arm, for pivoting the actuator guide and output shaft clutch plate between the first and second positions.

22. The locking differential for a model vehicle of claim 21, wherein a shape of the actuator guide comprises at least one set of opposing parallel surfaces configured to make contact with a wall of the outer track.

23. A locking differential for disabling the differential action between two or more wheels of a toy model vehicle, the locking differential comprising a differential gear carrier mounted coaxially on a first output shaft along a first axis, wherein the differential gear carrier provides for speed variations between the first output shaft and a second output shaft, which is rotationally coupled to the differential gear carrier along the first axis opposite the first output shaft, the locking differential further comprising:
a plurality of grooves on a first external face of the differential gear carrier, the plurality of grooves facing axially away from the differential gear carrier;
a slider mounted on and slideably coupled to the first output shaft, wherein the slider has at least one tooth extending from the first output shaft and facing toward the plurality of grooves of the differential gear carrier, and the at least one tooth is shaped to transmit torque;
a first support bearing is mounted to the differential gear carrier between the plurality of grooves on the first external face and the second output shaft; and
wherein the slider may be configured to move along the first output shaft to engage the differential gear carrier as to lock the first output shaft to the differential gear carrier, and wherein the slider is coupled to the first output shaft by a cross pin received in a first bore of the output shaft and configured to engage a recess in a second bore in the slider, the recess in the second bore having a section shape that varies along an axial depth to prevent the slider from disengaging from the differential gear carrier.

* * * * *